(12) United States Patent
Zheng et al.

(10) Patent No.: US 10,827,464 B2
(45) Date of Patent: Nov. 3, 2020

(54) METHOD AND APPARATUS FOR TRANSMITTING CONTROL DATA

(71) Applicant: HUAWEI TECHNOLOGIES CO., LTD., Guangdong (CN)

(72) Inventors: Juan Zheng, Beijing (CN); Lei Guan, Beijing (CN); Zhiyu Yan, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 56 days.

(21) Appl. No.: 16/053,752

(22) Filed: Aug. 2, 2018

(65) Prior Publication Data
US 2018/0343639 A1 Nov. 29, 2018

Related U.S. Application Data

(63) Continuation of application No. PCT/CN2016/073651, filed on Feb. 5, 2016.

(51) Int. Cl.
| | | |
|---|---|---|
| *H04W 72/02* | (2009.01) | |
| *H04W 16/14* | (2009.01) | |
| *H04W 24/10* | (2009.01) | |
| *H04W 48/16* | (2009.01) | |
| *H04W 48/18* | (2009.01) | |

(Continued)

(52) U.S. Cl.
CPC ........... *H04W 72/02* (2013.01); *H04W 16/14* (2013.01); *H04W 24/10* (2013.01); *H04W 48/16* (2013.01); *H04W 48/18* (2013.01); *H04W 72/0413* (2013.01); *H04W 72/0493* (2013.01); *H04W 72/10* (2013.01)

(58) Field of Classification Search
CPC ..... H04W 16/14; H04W 24/10; H04W 48/16; H04W 48/18; H04W 72/02; H04W 72/0413; H04W 72/0493; H04W 72/10
See application file for complete search history.

(56) References Cited

U.S. PATENT DOCUMENTS

| | | |
|---|---|---|
| 2014/0071931 A1 | 3/2014 | Lee et al. |
| 2016/0007350 A1* | 1/2016 | Xiong ............... H04W 24/10 370/252 |
| 2017/0063479 A1* | 3/2017 | Kim ................... H04L 5/001 |

(Continued)

FOREIGN PATENT DOCUMENTS

| | | |
|---|---|---|
| CN | 101272602 A | 9/2008 |
| CN | 102457929 A | 5/2012 |

(Continued)

*Primary Examiner* — Mewale A Ambaye
(74) *Attorney, Agent, or Firm* — Womble Bond Dickinson (US) LLP

(57) ABSTRACT

The present disclosure provides a method and an apparatus for transmitting control data. The method includes: determining, by a terminal device, at least one target cell from at least one unlicensed cell; and transmitting, by the terminal device, control data in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

17 Claims, 5 Drawing Sheets

(51) Int. Cl.
*H04W 72/04* (2009.01)
*H04W 72/10* (2009.01)

(56) References Cited

U.S. PATENT DOCUMENTS

| | | | | |
|---|---|---|---|---|
| 2017/0171781 | A1* | 6/2017 | Seo | H04W 24/10 |
| 2017/0245156 | A1 | 8/2017 | Gou et al. | |
| 2017/0280331 | A1 | 9/2017 | Gou et al. | |
| 2017/0373741 | A1* | 12/2017 | Yang | H04L 5/0053 |
| 2018/0110057 | A1* | 4/2018 | Park | H04B 7/0404 |
| 2018/0175975 | A1* | 6/2018 | Um | H04L 1/1816 |
| 2018/0220303 | A1* | 8/2018 | Futaki | H04W 48/16 |
| 2018/0220420 | A1* | 8/2018 | Harada | H04W 24/10 |
| 2019/0082436 | A1* | 3/2019 | Huang | H04W 16/32 |
| 2019/0313464 | A1* | 10/2019 | Einhaus | H04W 74/008 |
| 2020/0260251 | A1* | 8/2020 | Kim | H04L 5/0048 |

FOREIGN PATENT DOCUMENTS

| | | | |
|---|---|---|---|
| CN | 104301273 | A | 1/2015 |
| CN | 105101446 | A | 11/2015 |
| CN | 105207754 | A | 12/2015 |
| WO | 2005057968 | A1 | 6/2005 |
| WO | 2015167250 | A1 | 11/2015 |

* cited by examiner

200

A terminal device determines at least one target cell from at least one unlicensed cell — S210

The terminal device transmits control data in the target cell — S220

METHOD AND APPARATUS FOR TRANSMITTING CONTROL DATA

CROSS-REFERENCE TO RELATED APPLICATIONS

This application is a continuation of International Application No. PCT/CN2016/073651, filed on Feb. 5, 2016, the disclosure of which is hereby incorporated by reference in its entirety.

TECHNICAL FIELD

The present disclosure relates to the communications field, and more specifically, to a method and an apparatus for transmitting control data.

BACKGROUND

At present, to support technologies such as dynamic scheduling, downlink multiple-input multiple-output (MIMO, Multiple-Input Multiple-Output) transmission, and hybrid automatic repeat request (HARQ, Hybrid Automatic Repeat Request) technologies, a terminal device feeds back control data such as uplink control information (UCI, Uplink Control Information) to a network device on a physical uplink control channel (PUCCH, Physical Uplink Control Channel), a physical uplink shared channel (PUSCH, Physical Uplink Shared Channel), or the like that is carried on a licensed spectrum resource.

However, currently, with development and popularization of communications technologies and a significant increase in a quantity of terminal devices, licensed spectrum resources that can be provided for a communications system may not be sufficient. When a large quantity of terminal devices share same licensed spectrum resources, tremendous licensed spectrum resources are occupied to transmit UCI, and congestion may occur during transmission of control data. This greatly affects communication reliability and user experience.

SUMMARY

The present disclosure provides a method and an apparatus for transmitting control data, to improve communication reliability and user experience.

According to a first aspect, a method for transmitting control data is provided, where the method includes: determining, by a terminal device, at least one target cell from at least one unlicensed cell; and transmitting, by the terminal device, control data in the target cell.

With reference to the first aspect, in a first implementation of the first aspect, the determining, by a terminal device, at least one target cell from at least one unlicensed cell includes: determining, by the terminal device, a priority of each of the at least one unlicensed cell; and determining, by the terminal device, the at least one target cell from the at least one unlicensed cell based on the priority of each of the at least one unlicensed cell.

With reference to any one of the first aspect or the foregoing implementation of the first aspect, in a second implementation of the first aspect, the target cell is a highest-priority cell of the at least one unlicensed cell.

With reference to any one of the first aspect or the foregoing implementations of the first aspect, in a third implementation of the first aspect, the determining, by a terminal device, at least one target cell from at least one unlicensed cell includes: determining, by the terminal device, the target cell from the at least one unlicensed cell according to a first preset rule, where the target cell is a cell that is in an idle state according to the first preset rule, and the first preset rule is a rule used to determine whether a cell can be used to transmit control data.

With reference to any one of the first aspect or the foregoing implementations of the first aspect, in a fourth implementation of the first aspect, the target cell is in a busy state according to a second preset rule, and the second preset rule is a rule used to determine whether a cell can be used to transmit service data.

With reference to any one of the first aspect or the foregoing implementations of the first aspect, in a fifth implementation of the first aspect, the determining, by a terminal device, at least one target cell from at least one unlicensed cell includes: determining, by the terminal device, a transmission time period of the control data; and determining, by the terminal device, the target cell from the at least one unlicensed cell based on the transmission time period, where the transmission time period is within a transmission time range corresponding to the target cell, and the transmission time range is a time range corresponding to maximum channel occupancy time (MCOT) or a time range corresponding to one transmission opportunity (TXOP).

With reference to any one of the first aspect or the foregoing implementations of the first aspect, in a sixth implementation of the first aspect, there are at least two target cells.

With reference to any one of the first aspect or the foregoing implementations of the first aspect, in a seventh implementation of the first aspect, the transmitting, by the terminal device, control data in the target cell includes: transmitting, by the terminal device, the control data and uplink service data to a network device on an uplink service data channel of the target cell when determining that the target cell is in a busy state according to the second preset rule, where the second preset rule is a rule used to determine whether a cell can be used to transmit service data.

According to a second aspect, a method for transmitting control data is provided, where the method includes: determining, by a network device, at least one unlicensed cell; and receiving, by the network device in a target cell of the at least one unlicensed cell, control data sent by a terminal device.

With reference to the second aspect, in a first implementation of the second aspect, before the receiving, by the network device in a target cell of the at least one unlicensed cell, control data sent by a terminal device, the method further includes: sending, by the network device, first indication information to the terminal device, where the first indication information is used to indicate the at least one unlicensed cell.

With reference to any one of the second aspect or the foregoing implementation of the second aspect, in a second implementation of the second aspect, before the receiving, by the network device in a target cell of the at least one unlicensed cell, control data sent by a terminal device, the method further includes: sending, by the network device, second indication information to the terminal device, where the second indication information is used to indicate the target cell.

With reference to any one of the second aspect or the foregoing implementations of the second aspect, in a third implementation of the second aspect, before the receiving, by the network device in a target cell of the at least one unlicensed cell, control data sent by a terminal device, the method further includes: sending, by the network device, priority indication information to the terminal device, where the priority indication information is used to indicate a priority of each of the at least one unlicensed cell.

With reference to any one of the second aspect or the foregoing implementations of the second aspect, in a fourth implementation of the second aspect, before the receiving, by the network device in a target cell of the at least one unlicensed cell, control data sent by a terminal device, the method further includes: sending, by the network device, transmission time range indication information to the terminal device, where the transmission time range indication information is used to indicate a transmission time range corresponding to each of the at least one unlicensed cell.

With reference to any one of the second aspect or the foregoing implementations of the second aspect, in a fifth implementation of the second aspect, the target cell is a highest-priority cell of the at least one unlicensed cell.

With reference to any one of the second aspect or the foregoing implementations of the second aspect, in a sixth implementation of the second aspect, the target cell is a cell that is in an idle state according to a first preset rule, and the first preset rule is a rule used to determine whether a cell can be used to transmit control data.

With reference to any one of the second aspect or the foregoing implementations of the second aspect, in a seventh implementation of the second aspect, the first preset rule is different from a second preset rule, and the second preset rule is a rule used to determine whether a cell can be used to transmit service data.

With reference to any one of the second aspect or the foregoing implementations of the second aspect, in an eighth implementation of the second aspect, a transmission time period of the control data is within a transmission time range corresponding to the target cell, and the transmission time range is a time range corresponding to maximum channel occupancy time (MCOT) or a time range corresponding to one transmission opportunity (TXOP).

With reference to any one of the second aspect or the foregoing implementations of the second aspect, in a ninth implementation of the second aspect, there are at least two target cells.

With reference to any one of the second aspect or the foregoing implementations of the second aspect, in a tenth implementation of the second aspect, the receiving, by the network device in a target cell of the at least one unlicensed cell, control data sent by a terminal device includes: receiving, by the network device on a service data channel of the target cell, the control data sent by the terminal device.

With reference to any one of the second aspect or the foregoing implementations of the second aspect, in an eleventh implementation of the second aspect, the receiving, by the network device on a service data channel of the target cell, the control data sent by the terminal device includes: receiving, by the network device on the service data channel of the target cell, the control data and service data that are sent by the terminal device, where the target cell is in a busy state according to the second preset rule, and the second preset rule is a rule used to determine whether a cell can be used to transmit service data.

With reference to any one of the second aspect or the foregoing implementations of the second aspect, in a twelfth implementation of the second aspect, an uplink control channel is configured for at least one cell of the at least one unlicensed cell.

According to a third aspect, an apparatus for transmitting control data is provided, including a module or a unit configured to implement the first aspect and the implementations of the first aspect.

According to a fourth aspect, an apparatus for transmitting control data is provided, including a module or a unit configured to implement the second aspect and the implementations of the second aspect.

According to a fifth aspect, a computer program product is provided, where the computer program product includes computer program code, and when the computer program code is run by a receiving unit, a processing unit, and a sending unit, or by a receiver, a processor, and a transmitter of a terminal device, the terminal device performs the method for transmitting control data in any one of the first aspect and the implementations of the first aspect.

According to a sixth aspect, a computer program product is provided, where the computer program product includes computer program code, and when the computer program code is run by a receiving unit, a processing unit, and a sending unit, or by a receiver, a processor, and a transmitter of a network device, the network device performs the method for transmitting control data in any one of the second aspect and the implementations of the second aspect.

According to a seventh aspect, a computer-readable storage medium is provided, where a program is stored in the computer-readable storage medium, and the program causes terminal device to perform the method for transmitting control data in any one of the first aspect and the implementations of the first aspect.

According to an eighth aspect, a computer-readable storage medium is provided, where a program is stored in the computer-readable storage medium, and the program causes a network device to perform the method for transmitting control data in any one of the second aspect and the implementations of the second aspect.

According to the method and the apparatus for transmitting control data provided in the embodiments of the present disclosure, the terminal device determines the target cell from an unlicensed cell set including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

BRIEF DESCRIPTION OF DRAWINGS

To describe the technical solutions in the embodiments of the present disclosure more clearly, the following briefly describes the accompanying drawings for describing the embodiments of the present disclosure. Apparently, the accompanying drawings in the following description show merely some embodiments of the present disclose, and a person of ordinary skill in the art may still derive other drawings from these accompanying drawings without creative efforts.

DESCRIPTION OF EMBODIMENTS

Figures 1, 2:
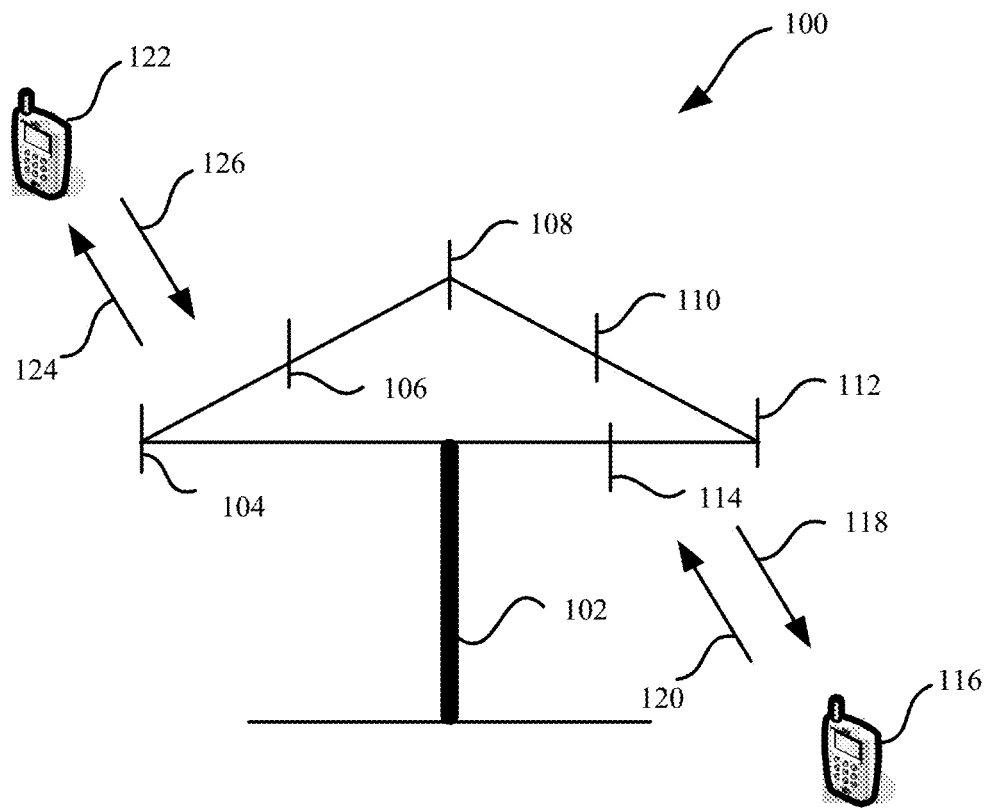
FIG. 1 is a schematic diagram of an example of a communications system to which a method and an apparatus for transmitting control data can be applied according to an embodiment of the present disclosure.
FIG. 2 is a schematic flowchart of a method for transmitting control data according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computation device and an application that runs on the computation device may be components. One or more components may reside within a process and/or a thread of execution, and a component may be located on one computer and/or distributed on two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or on a network such as the Internet interacting with another system by using the signal).

The solutions in the embodiments of the present disclosure can be applied to an existing cellular communications system, such as a Global System for Mobile Communications (full name in English: Global System of Mobile Communications, GSM for short), a Wideband Code Division Multiple Access (full name in English: Wideband Code Division Multiple Access, WCDMA for short) system, or a Long Term Evolution (full name in English: Long Term Evolution, LTE for short) system. Supported communication is mainly voice and data communication. Generally, a conventional base station supports a limited quantity of connections and is easy to implement.

A next-generation mobile communications system not only supports conventional communication, but also supports M2M (full name in English: Machine to Machine) communication, or referred to as MTC (full name in English: Machine Type Communication) communication. As predicted, there will be 50 billion to 100 billion MTC devices connected to a network by the year 2020. This greatly exceeds a current quantity of connections. M2M services are diverse in service types, and different types of M2M services have quite different network requirements. Roughly, there may be the following several requirements:

reliable latency-insensitive transmission; and highly reliable low-latency transmission.

A service requiring reliable latency-insensitive transmission is relatively easy to deal with. However, a highly reliable low-latency transmission service, such as a V2V (full name in English: Vehicle to Vehicle) service or a V2X (full name in English: Vehicle to Everything) service, requires not only a low transmission latency but also high reliability. Unreliable transmission may lead to retransmission. As a result, a transmission latency is excessively high, and requirements cannot be met.

Due to existence of a large quantity of connections, there is a significant difference between a future wireless communications system and an existing communications system. Because of the large quantity of connections, more resources may be consumed for terminal device access, and more resources may be consumed for transmission of scheduling signaling related to data transmission of a terminal device. The solutions in the embodiments of the present disclosure can effectively resolve the resource consumption problem.

Optionally, the terminal device is user equipment.

In the present disclosure, the embodiments are described with reference to a terminal device. The terminal device may also be referred to as user equipment (UE, User Equipment), a mobile station, an access terminal, a subscriber unit, a subscriber station, a mobile station, a remote station, a remote terminal, a mobile device, a user terminal, a terminal, a wireless communications device, a user agent, a user apparatus, or the like. The terminal device may be an STA (STATION, station) in a WLAN (Wireless Local Area Network, wireless local area network), or may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a radio communication function, a computation device, another processing device connected to a wireless modem, an in-vehicle device, a wearable device, a mobile station in a future 5G network, a terminal device in a future evolved PLMN network, or the like.

In addition, in the embodiments of the present disclosure, the terminal device may also include another device, such as a relay (Relay), that can perform data communication with a network device (such as a base station).

In the embodiments of the present disclosure, the terminal device can use an unlicensed spectrum resource for radio communication.

The unlicensed spectrum resource is a resource included in an unlicensed spectrum that does not need to be allocated by a system and that can be shared by communications devices. In the case of sharing of a resource on an unlicensed frequency band, only restrictions on indicators such as transmit power and out-of-band leakage are set for use of a particular frequency spectrum, to ensure that a plurality of devices that share the frequency band meet a basic coexistence requirement. An operator uses an unlicensed frequency band resource to implement network traffic offload, but laws and rules in different regions and requirements of different frequency spectrums on unlicensed frequency band resources should to be met. These requirements are usually set for protecting a public system such as a radar, avoiding mutual negative impact between a plurality of systems as far as possible, and ensuring fair coexistence, and include transmit power limitation, an out-of-band leakage indicator, outdoor and indoor usage limitation, some coexistence policies additionally set in some regions, and the like. For example, communications devices can use a spectrum resource through contention, through listening such as listen before talk (LBT, Listen Before Talk), or in another specified manner.

As an example instead of limitation, in the embodiments of the present disclosure, the unlicensed spectrum resource may be a frequency band of about 900 MHz near 5 GHz, and a frequency band of about 90 MHz near the 2.4 GHz frequency band.

In addition, in the embodiments of the present disclosure, the terminal device may also use a licensed spectrum resource for radio communication.

The licensed spectrum resource is a spectrum resource that can be used only with approval of a national or a local radio communications commission. Different systems such as an LTE system and a Wi-Fi system or systems owned by different operators cannot share a licensed spectrum resource.

In the present disclosure, the embodiments are described with reference to a network device. The network device may be a device used to communicate with a mobile station, or may be an AP (ACCESS POINT, access point) in a WLAN (Wireless Local Area Network, wireless local area network), a BTS (Base Transceiver Station, base transceiver station) in GSM or CDMA (Code Division Multiple Access, Code Division Multiple Access), an NB (NodeB, NodeB) in WCDMA, an eNB or eNodeB (Evolved Node B, evolved NodeB) in LTE (Long Term Evolution, Long Term Evolution), a relay station, an access point, an in-vehicle device, a wearable device, a network device in a future 5G network, a network device in a future evolved PLMN network, or the like.

In the embodiments of the present disclosure, the network device can use the unlicensed spectrum resource for radio communication.

In addition, in the embodiments of the present disclosure, the network device may also use a licensed spectrum resource for radio communication.

In addition, aspects or features of the present disclosure may be implemented as a method, an apparatus, or a product that uses standard programming and/or engineering technologies. The term "product" used in this application covers a computer program that can be accessed from any computer-readable device, carrier, or medium. For example, the computer-readable medium may include, but is not limited to, a magnetic memory device (such as a hard disk, a floppy disk, or a magnetic tape), an optical disc (such as a CD (Compact Disc, compact disc) or a DVD (Digital Versatile Disc, digital versatile disc)), a smart card, and a flash memory device (such as an EPROM (Erasable Programmable Read-Only Memory, erasable programmable read-only memory), a card, a stick, or a key drive). In addition, various storage media described in this specification may indicate one or more devices and/or other machine-readable media that are used to store information. The term "machine-readable media" may include, but is not limited to, a radio channel, and various other media that can store, contain, and/or carry an instruction and/or data.

FIG. 1 is a schematic diagram of a communications system 100 for transmitting control data to which the present disclosure can be applied. As shown in FIG. 1, the communications system 100 includes a network device 102. The network device 102 may include a plurality of antennas, such as antennas 104, 106, 108, 110, 112, and 114. In addition, the network device 102 may additionally include a transmitter chain and a receiver chain. A person of ordinary skill in the art may understand that, both the transmitter chain and the receiver chain may include a plurality of components related to signal transmission and reception (such as a processor, a modulator, a multiplexer, a demodulator, a demultiplxer, and an antenna).

The network device 102 may communicate with a plurality of terminal devices (such as a terminal device 116 and a terminal device 122). However, it can be understood that, the network device 102 may communicate with any quantity of terminal devices similar to the terminal device 116 or 122. The terminal device 116 or 122 may be, for example, a cellular phone, a smartphone, a portable computer, a handheld communications device, a handheld computation device, a satellite radio apparatus, a global positioning system, a PDA, and/or any other proper device that is used for communication over the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD, Frequency Division Duplex) system, the forward link 118 may use a frequency band different from a frequency band used by the reverse link 120, and the forward link 124 may use a frequency band different from a frequency band used by the reverse link 126.

For another example, in a time division duplex (TDD, Time Division Duplex) system and a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or a region that are/is designed for communication are/is referred to as a sector of the network device 102. For example, the antenna group may be designed to communicate with a terminal device in a sector of a coverage region of the network device 102. In a process in which the network device 102 communicates with the terminal devices 116 and 122 by using the forward links 118 and 124 respectively, transmit antennas of the network device 102 may improve signal-to-noise ratios of the forward links 118 and 124 through beamforming. In addition, compared with a manner that a network device sends, by using a single antenna, a signal to all terminal devices served by the network device, when the network device 102 sends signals through beamforming to the terminal devices 116 and 122 randomly scattered in a related coverage area, a mobile device in a neighboring cell receives less interference.

At given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that are to be sent to the wireless communications receiving apparatus on a channel. The data bits may be included in a data transport block (or a plurality of transport blocks), and the transport block may be segmented to generate a plurality of code blocks.

In addition, the communications system 100 may be a public land mobile network (full name in English: Public Land Mobile Network, PLMN for short), a D2D network, an M2M network, a V2V network, a V2X network, or another network. FIG. 1 is merely an example of a simplified schematic diagram. The network may further include another network device not shown in FIG. 1.

The communications system 100 in this embodiment of the present disclosure is a communications system that can use an unlicensed frequency band. As an example instead of limitation, the communications system 100 may use an LAA-LTE (Licensed-Assisted Access Using LTE) technology, or may use a technology, such as standalone LTE over unlicensed spectrum, that allows the communications system to be independently deployed on an unlicensed frequency band, or may use an LTE-U (LTE-U, LTE Advanced in unlicensed spectrums) technology. That is, in the communications system 100, an LTE system may be independently deployed on an unlicensed frequency band, so as to perform communication on the unlicensed frequency band by using an LTE air interface protocol. The system does not include a licensed frequency band. The LTE system deployed on the unlicensed frequency band may use technologies such as centralized scheduling, interference coordination, and hybrid automatic repeat request (HARQ). Compared with an access technology such as Wi-Fi, the foregoing technologies offer better robustness, can obtain higher spectrum efficiency, and provide a larger coverage area and better user experience.

In this embodiment of the present disclosure, the communications system 100 may use a technology such as licensed-assisted access (LAA, Licensed-Assisted Access), dual connectivity (DC, Dual Connectivity), and standalone (Standalone). In the licensed-assisted access LAA, a configuration and a structure for carrier aggregation (Carrier Aggregation, CA) in an existing LTE system are used to configure a carrier (a licensed carrier) on a licensed frequency band of an operator for communication, and on this basis, a plurality of carriers (unlicensed carriers) on an unlicensed frequency band are configured, and communication is performed on the unlicensed carriers, assisted by the licensed carrier. That is, by using CA, an LTE device may use a licensed carrier as a primary component carrier (PCC, Primary Component Carrier) or a primary cell (PCell, Primary Cell), and an unlicensed carrier as a secondary component carrier (SCC, Secondary Component Carrier) or a secondary cell (SCell, Secondary Cell). The dual connectivity DC technology includes a technology of using a licensed carrier and an unlicensed carrier together through non-CA (or non-ideal backhaul), or includes a technology of using a plurality of unlicensed carriers together through non-CA. The LTE device may also be directly deployed on an unlicensed carrier in an independent deployment manner.

FIG. 2 is a schematic flowchart of a method 200 for transmitting control data that is described from a perspective of a terminal device according to an embodiment of the present disclosure. As shown in FIG. 2, the method 200 includes the following blocks.

S210. A terminal device determines at least one target cell from at least one unlicensed cell.

S220. The terminal device transmits control data in the target cell.

Specifically, in some embodiments of the present disclosure, a network device can provide N unlicensed cells (which may also be referred to as unlicensed carriers) and M licensed cells (which may also be referred to as licensed carriers), where $N \geq 1$ and $M \geq 1$.

In this embodiment of the present disclosure, that the network device can provide N unlicensed cells may include: The network device provides the N unlicensed cells based on a capability of simultaneously operating on a plurality of unlicensed cells. An eNB is used as an example. If the eNB can simultaneously operate on five carriers, the eNB can provide five cells at most.

In this case, the terminal device and the network device may use the N unlicensed cells and the M licensed cells based on, for example, a carrier aggregation (CA, Carrier Aggregation) technology or a DC technology.

As an example instead of limitation, the licensed carrier may be used as a primary component carrier or a primary cell, and the unlicensed carrier (which may also be referred to as an unlicensed carrier) may be used as a secondary component carrier or a secondary cell.

In this embodiment of the present disclosure, the primary cell and the secondary cell may be served by a same base station. That is, in this embodiment of the present disclosure, the network device may be one network device that provides a licensed cell (a frequency band corresponding to the cell is a licensed frequency band) and an unlicensed cell (a frequency band corresponding to the cell is an unlicensed frequency band).

Alternatively, in this embodiment of the present disclosure, the primary cell and the secondary cell may be served by different base stations, and there is an ideal backhaul path between the cells. That is, in this embodiment of the present disclosure, the network device may include a network device that provides a licensed cell and a network device that provides an unlicensed cell.

In some embodiments of the present disclosure, the network device may provide only the N unlicensed cells and does not provide a licensed cell, where $N \geq 1$. For example, the network device may be a network device in a standalone LTE over unlicensed spectrum system.

In this case, the terminal device and the network device may use the N unlicensed cells based on, for example, a CA technology or a DC technology. For example, when the DC technology is used, the network device may be a primary base station or a secondary base station in the DC technology.

As an example instead of limitation, one unlicensed carrier may be used as a primary component carrier PCC or a PCell, and another unlicensed carrier may be used as a secondary component carrier or a secondary cell.

In this embodiment of the present disclosure, the primary cell and the secondary cell may be served by a same base station. That is, in this embodiment of the present disclosure, the network device may be one network device that provides a plurality of unlicensed cells.

Alternatively, in this embodiment of the present disclosure, the primary cell and the secondary cell may be served by different base stations, and there is an ideal backhaul path between the cells. That is, in this embodiment of the present disclosure, the network device may be a plurality of network devices that provide unlicensed cells.

In the present disclosure, the mentioned cell may be a cell corresponding to a base station. The cell may be served by a macro base station or a base station corresponding to a small cell (small cell). The small cell herein may be a metro cell (Metro cell), a micro cell (Micro cell), a pico cell (Pico cell), a femto cell (Femto cell), or the like. These small cells feature a small coverage area and low transmit power, and are suitable for providing a high-rate data transmission service.

For another example, in a system such as LTE, a plurality of cells may simultaneously operate on a same carrier, and the carrier and the cell may be considered to be the same conceptually. For example, in a CA scenario, when a secondary component carrier is configured for UE, both a carrier index of the secondary component carrier and a cell identity (Cell ID, Cell Identity) of a secondary cell operating on the secondary component carrier are carried. In this case, the carrier and the cell may be considered to be the same conceptually. For example, that the terminal device accesses a carrier is the same as that the terminal accesses a cell. That is, in the description of this embodiment of the present disclosure, a "cell" may be replaced with a "carrier".

Optionally, before the determining, by a terminal device, at least one target cell from at least one unlicensed cell, the method further includes:

obtaining, by the terminal device, the at least one unlicensed cell.

The obtaining, by the terminal device, the at least one unlicensed cell may be construed as determining, by the terminal device, the at least one unlicensed cell.

In addition, the obtaining, by the terminal device, the at least one unlicensed cell includes:

obtaining, by the terminal device, an unlicensed cell set, where the unlicensed cell set includes the at least one unlicensed cell; and the determining, by a terminal device, at least one target cell from at least one unlicensed cell includes:

determining, by the terminal device, the at least one target cell from the unlicensed cell set.

Specifically, in this embodiment of the present disclosure, the terminal device may use some (at least one) or all of the N unlicensed cells as K unlicensed cells (namely, an example of the at least one unlicensed cell) that are used to determine the target cell, where 1≤K≤N.

In addition, in this embodiment of the present disclosure, the K unlicensed cells may be considered as cells included in the unlicensed cell set.

The following details a method and a process for obtaining the K unlicensed cells by the terminal device.

Optionally, each of the K unlicensed cells may be used to transmit the control data. In other words, the terminal device may transmit the control data in each of the K unlicensed cells.

An uplink control channel is configured for at least one cell of the at least one unlicensed cell.

Specifically, at least one cell of the K unlicensed cells has a physical uplink control channel (PUCCH, Physical Uplink Control Channel).

As an example instead of limitation, in this embodiment of the present disclosure, the terminal device may learn of the K unlicensed cells (namely, the unlicensed cell set) in the following Manner 1 or Manner 2.

Manner 1

In this embodiment of the present disclosure, indication information of the K unlicensed cells may be preset in the terminal device by using standard protocol specifications, factory settings, or the like. That is, the K unlicensed cells are preconfigured.

Manner 2

Optionally, before the determining, by a terminal device, at least one target cell from at least one unlicensed cell, the method further includes:

receiving, by the terminal device, first indication information sent by the network device, where the first indication information is used to indicate the at least one unlicensed cell.

In this embodiment of the present disclosure, the network device may deliver indication information of each of the K unlicensed cells (such as a cell identity of each of the K unlicensed cells) to the terminal device, so that the terminal device can determine the K unlicensed cells (namely, the unlicensed cell set) based on an indication of the network device.

As an example instead of limitation, the indication of the network device may be carried in radio resource control (RRC, Radio Resource Control) signaling, and/or physical layer signaling, and/or Medium Access Control (MAC, Medium Access Control) signaling.

For example, as an example instead of limitation, the indication information of the K unlicensed cells may be delivered in a terminal device access process. That is, the indication information of the K unlicensed cells may be carried in semi-static signaling such as radio resource control signaling.

Alternatively, the indication information of the K unlicensed cells may be delivered in a data transmission process of the terminal device. That is, the indication information of the K unlicensed cells may be carried in dynamic signaling such as physical layer signaling.

It should be noted that, a cell indicated by the indication information of the K unlicensed cells that is delivered by the network device may be fixed, semi-statically changed, or dynamically changed. This is not specially limited in the present disclosure.

As an example instead of limitation, it is assumed that the terminal device should transmit the control data such as uplink control information (UCI, Uplink Control Information) in a subframe n. If in the subframe n, the terminal device has a scheduled uplink resource such as a PUSCH, a cell that includes the PUSCH may be a cell included in the K unlicensed cells. That is, the terminal device may consider a cell corresponding to an uplink resource scheduled through uplink grant (UL grant) as a cell included in the K unlicensed cells. The "cell corresponding to an uplink resource" may be construed as a cell that includes the uplink resource. For example, in a frequency division duplex (FDD, Frequency Division Duplex) system, if the network device (such as a base station) that serves the terminal device schedules, at a moment corresponding to a subframe n−4, the terminal device to transmit uplink data in the subframe n in a cell #1, the cell #1 may be used as a cell included in the K unlicensed cells. The UL grant may be construed as one of the indication information sent by the network device. After receiving the indication information, the terminal device may determine a cell included in the K unlicensed cells.

As an example instead of limitation, if cells in the K unlicensed cells are all cells that can be used to transmit the control data, the network device may directly transmit, to the terminal device, indication information for the cells that can be used to transmit the control data. For example, the network device may provide two cells (Cell), marked as a cell #1 and a cell #2, for transmitting control data. The network device may indicate the cell #1 to the terminal device. This includes that when configuring and/or activating the cell #1 for the terminal device, the network device indicates that the cell #1 can be used to transmit the control data. A same operation is performed on the cell #2, and details are not repeated herein. Based on this, the terminal device determines the cell #1 and the cell #2 as cells included in the K unlicensed cells. For another example, the network device directly indicates that the cell #1 includes a physical uplink control channel (PUCCH, Physical Uplink Control Channel). Control data may be transmitted on a PUCCH, and therefore, the terminal device may determine the cell #1 as a cell included in the K unlicensed cells. A same operation is performed on the cell #2, and details are not repeated herein. For another example, the network device may directly indicate to the terminal device that the cell #1 can be used to transmit the control data. A same operation is performed on the cell #2, and details are not repeated herein.

As an example instead of limitation, the terminal device may use all configured unlicensed cells as the K unlicensed cells, namely, the cells included in the unlicensed cell set. For example, in the case of CA, usually, the network device may first configure at least one cell for the terminal device through RRC signaling. The configured cell includes a PCell and/or an SCell. After receiving the configuration signaling, the terminal device performs radio resource management (RRM, Radio Resource Management) measurement on the configured cell. The RRM measurement includes at least one of the following: reference signal received power (RSRP, Reference Signal Received Power), reference signal received quality (RSRQ, Reference Signal Received Quality), or a received signal strength indicator (RSSI, Received Signal Strength Indicator). The network device may determine, based on an RRM measurement result of the terminal device, whether to activate the configured cell for the terminal device through, for example, Media Access Control MAC signaling. The terminal device may perform signal detection, and/or data demodulation, and/or channel state information (CSI, Channel State Information) measurement on the activated cell. Therefore, in this embodiment of the present disclosure, the terminal device may use all configured unlicensed cells as cells in the K unlicensed cells, or may use all activated unlicensed cells as cells in the K unlicensed cells.

In addition, the network device may directly configure a cell set. The cell set includes at least one (such as K) unlicensed cell. Any cell included in the cell set can be used to transmit the control data. For example, the network device sends indication information. The indication information is used to indicate an unlicensed cell set, and the unlicensed cell set includes the K unlicensed cells. After receiving the indication information, the terminal device may determine the unlicensed cell set, and determine the K unlicensed cells included in the unlicensed cell set.

For another example, the K preconfigured unlicensed cells may include at least one of the following cells: a primary cell PCell for the terminal device, an activated SCell, and a configured SCell.

The foregoing method for obtaining the K unlicensed cells by the terminal device may also be construed as a method for determining, by the terminal device, a cell (specifically, an unlicensed cell) included in the K unlicensed cells.

In S210, the terminal device may determine, from the K unlicensed cells (namely, an example of the at least one unlicensed cell), the at least one target cell used to transmit the control data.

In this embodiment of the present disclosure, the terminal device may determine the target cell based on a priority of each cell (that is, in Manner A), or the terminal device may determine the target cell based on whether each cell meets a preset condition (that is, in Manner B). The foregoing two cases are separately described in detail below.

Manner A

Optionally, the determining, by a terminal device, at least one target cell from at least one unlicensed cell includes:

determining, by the terminal device, a priority of each of the at least one unlicensed cell; and determining, by the terminal device, the at least one target cell from the at least one unlicensed cell based on the priority of each of the at least one unlicensed cell.

Specifically, in this embodiment of the present disclosure, the terminal device may determine a priority of each of the K unlicensed cells, and determine the target cell based on the priority of each unlicensed cell.

First, a method for determining the priority of each unlicensed cell by the terminal device is described in detail.

The terminal device may determine the priority of each unlicensed cell based on an indication of the network device and/or detection performed by the terminal device.

Optionally, the determining, by the terminal device, a priority of each of the at least one unlicensed cell includes:

determining, by the terminal device, the priority of each of the at least one unlicensed cell based on an indication of the network device.

Specifically, for example, the network device may directly indicate the priority of each cell to the terminal device. Assuming that the terminal device obtains two unlicensed cells (for example, a cell #1 and a cell #2), the network device may directly indicate to the terminal device that the cell #1 is a first-priority cell, and that the cell #2 is a second-priority cell. A first priority is higher than a second priority.

Based on this, the terminal device may directly determine the priorities of the cells based on the indication of the network device.

Optionally, the determining, by the terminal device, a priority of each of the at least one unlicensed cell includes:

determining, by the terminal device, an index number of each of the at least one unlicensed cell, and determining, by the terminal device, the priority of each of the at least one unlicensed cell based on the index number of each cell.

Specifically, in this embodiment of the present disclosure, the terminal device may obtain the index number (which may also be referred to as a "cell index") of each cell. As an example instead of limitation, the index number of each cell may be configured by the network device for the terminal device when the network device allocates (or indicates) each of the K unlicensed cells to the terminal device. For example, in the case of CA, when the network device configures a PCell and/or an SCell for the user equipment through RRC signaling, the RRC signaling includes a cell index (CellIndex) corresponding to the PCell and/or a cell index corresponding to the SCell. Herein, there may be one or more PCells, and there may also be one or more SCells. In this way, the terminal device may determine the index number of each cell. Alternatively, the terminal device may determine the index number of each cell through blind detection. For example, the terminal device may determine, by detecting a reference signal, an index number corresponding to a cell in which the reference signal is sent. The reference signal includes cell index information. For example, the terminal device may determine a cell identification (Cell ID, Cell Identification) by detecting a primary synchronization signal (PSS, Primary Synchronization Signal) and a secondary synchronization signal (SSS, Secondary Synchronization Signal). In one case, the terminal device may directly use the cell ID as the index number of the cell. In another case, there may be a correspondence between the cell ID and the index number of the cell, and the terminal device may determine, based on the correspondence, the index number corresponding to the cell. The index number of the cell may be represented by an integer not less than 0, or may be represented in another manner. In this embodiment of the present disclosure, the terminal device may determine the index number of the cell based on the indication of the network device, or may determine the index number of the cell through data detection or blind detection.

Then, the terminal device may determine whether priorities of the cells are high or low based on values of index numbers of the cells.

For example, in this embodiment of the present disclosure, the terminal device may determine the priority of each cell on a basis that a smaller index number indicates a higher priority.

It should be understood that, the enumerated value correspondence between the index number and the priority is merely an example, and the present disclosure is not limited thereto. For example, the terminal device may alternatively determine the priority of each cell on a basis that a larger index number indicates a higher priority. Alternatively, the terminal device may determine, based on another correspondence between the cell index number and the priority, the priority corresponding to each cell, and the another correspondence is configured by the network device.

It should be understood that, the correspondence between the cell index number and the priority may be configured or indicated by the network device, or may be predefined according to, for example, standard protocol specifications.

Optionally, the determining, by the terminal device, the at least one target cell from the at least one unlicensed cell based on the priority of each of the at least one unlicensed cell includes:

using, by the terminal device as the target cell, a cell that is of the at least one unlicensed cell and whose priority meets a preset feature.

Specifically, for example, the terminal device may determine only a highest-priority cell of the at least one unlicensed cell. For another example, the terminal device may determine only a lowest-priority cell of the at least one unlicensed cell.

In this case, the terminal device may directly determine the target cell based on the indication of the network device. For example, if there is only one cell of the at least one unlicensed cell can be used to transmit the control data, the network device may directly indicate information (including cell identification information) about this cell to the terminal device, and may further instruct the terminal device to transmit the control data only in the cell, that is, to transmit the control data only in the cell of the unlicensed cell. In this case, the terminal device may determine the cell as a cell that is of the at least one unlicensed cell and that has a highest priority for transmitting the control data, and then use the cell as the target cell.

In addition, the foregoing enumerated solution for determining the priority based on an index number is merely an example, and the present disclosure is not limited thereto. For example, the terminal device may alternatively listen for channel quality of each cell, and determine the priority of each cell based on the channel quality of each cell. In this case, as an example instead of limitation, the terminal device may determine the priority of each cell on a basis that better channel quality indicates a higher priority.

Optionally, the target cell is a highest-priority cell of the at least one unlicensed cell.

In this embodiment of the present disclosure, the terminal device may use the highest-priority cell (for example, a cell with a smallest index number) of the at least one unlicensed cell as the target cell.

In this embodiment of the present disclosure, after determining the highest-priority cell (which is marked as a cell #A hereinafter for ease of understanding and differentiation), the terminal device may directly transmit the control data in the cell #A. For example, the control data is transmitted in the cell #A at a moment of transmitting the control data. In this embodiment of the present disclosure, the moment of transmitting the control data may be represented by a subframe, a timeslot, or an orthogonal frequency division multiplexing (OFDM, Orthogonal Frequency Division Multiplexing) symbol. For example, the moment of transmitting the control data may be represented by a subframe #n, may be represented by a timeslot #k, or may be represented by an OFDM symbol #l, where n, k, and l may be integers not less than 0.

Alternatively, after determining the cell #A, the terminal device may further determine whether the cell #A meets a preset condition, and transmit the control data based on a determining result.

In this embodiment of the present disclosure, the preset condition may be set in the following manners.

Manner α

For example, the preset condition may include a determining condition that is based on a status of a cell (for example, whether a cell is occupied).

That is, optionally, before the transmitting, by the terminal device, control data in the target cell, the method includes:

determining, by the terminal device, that the target cell is in an idle state according to a first preset rule, where the first preset rule is a rule used to determine whether a cell can be used to transmit control data.

Specifically, in this embodiment of the present disclosure, the status of a cell may include a busy state (which is marked as a busy state #1 hereinafter for ease of understanding and differentiation) specific to the control data and an idle state (which is marked as an idle state #1 hereinafter for ease of understanding and differentiation) specific to the control data.

In this case, for example, the preset condition may be: The cell #A is in the idle state #1.

Herein, "the cell #A is in the idle state #1" may mean that the cell #A is in the idle state #1 in a transmission time period of the control data. In this embodiment of the present disclosure, the transmission time period of the control data may also be construed as the moment of transmitting the control data. It should be noted that, in this embodiment of the present disclosure, that the cell #A is in the idle state #1 means that the cell #A can transmit the control data by using an unlicensed spectrum resource, or may be construed as that the cell #A can send the control data in the transmission time period of the control data by using an unlicensed spectrum resource.

In this case, the terminal device may determine the transmission time period of the control data. For example, the terminal device may determine a transmission time period of an uplink HARQ-ACK (HARQ acknowledgment) based on a downlink hybrid automatic repeat request (HARQ, Hybrid Automatic Repeat Request) timing relationship. It is assumed that the terminal device detects, in a subframe n−4, a physical downlink control channel (PDCCH, Physical Downlink Control Channel) and/or a physical downlink shared channel (PDSCH, Physical Downlink Shared Channel) that are/is sent to the terminal device. In a frequency division duplex (FDD, Frequency Division Duplex) system, based on the downlink HARQ timing relationship, the terminal device transmits the HARQ-ACK (namely, an example of uplink data) in a subframe n. Correspondingly, the transmission time period of the control data is the subframe n.

For another example, the terminal device may alternatively determine the transmission time period based on a control data transmission time period periodically configured by the network device. For example, for periodic CSI reporting, the network device may configure, for the terminal device, a moment of reporting periodic CSI, and the reporting moment herein may be corresponding to the transmission time period of the control data. For another example, the terminal device may alternatively determine the transmission time period of the control data based on indication information sent by the network device. For example, if the network device aperiodically triggers, in a subframe n−4, the terminal device to report aperiodic CSI, in an FDD system, the terminal device should report the aperiodic CSI in a subframe n. The subframe n herein may be corresponding to the transmission time period of the control data.

Herein, generally, assuming that the terminal device should send the control data in a subframe n, the subframe n may be corresponding to the transmission time period of the control data. The terminal device may determine, prior to the subframe n, whether the cell #A is in the idle state #1 in the subframe n. If the terminal device determines that the cell #A is in the idle state #1 in the subframe n, the terminal device can transmit the control data in the cell #A in the subframe n. It should be noted that, that the cell #A is in the idle state #1 in the subframe n may be construed as that the data can be transmitted in the cell #A in the subframe n by using an unlicensed spectrum resource.

As an example instead of limitation, if the terminal device determines that the cell #A is in the idle state #1, the terminal device may determine that the control data can be transmitted in the cell #A. In this case, the terminal device can use the cell #A as the target cell.

If the terminal device determines that the cell #A is in the busy state #1, the terminal device may determine that the control data cannot be transmitted in the cell #A, or the terminal device may determine that the control data cannot be transmitted in the transmission time period of the control data in the cell #A. In this case, the terminal device cannot use the cell #A as the target cell.

In addition, in this case, the terminal device may give up transmitting the control data. Alternatively, with reference to the foregoing example, the terminal device may give up transmitting the control data in the subframe n.

Optionally, a priority of the target cell is lower than a priority of a first cell of the at least one unlicensed cell, and the first cell is in a busy state according to the first preset rule.

Specifically, the terminal device may alternatively select, from the at least one unlicensed cell, a cell other than the cell #A (namely, an example of the first cell), such as a cell (which is marked as a cell #B hereinafter for ease of understanding and differentiation) whose priority is lower than that of the cell #A.

In this case, the terminal device may directly transmit the control data in the cell #B.

Alternatively, the terminal device may determine a status of the cell #B, and determine, based on the status of the cell #B, whether to transmit the control data in the cell #B.

It should be noted that, a specific process for determining the status of the cell #B and performing processing based on the status of the cell #B by the terminal device may be similar to the process for determining the status of the cell #A and performing processing based on the status of the cell #A.

Alternatively, a specific process for determining the status of the cell #B and performing processing based on the status of the cell #B by the terminal device may not be similar to the process for determining the status of the cell #A and performing processing based on the status of the cell #A. For example, a rule used by the terminal device in the process for determining the status of the cell #B to determine whether the cell can be used to transmit the control data may be different from the rule used by the terminal device in the process for determining the status of the cell #A to determine whether the cell can be used to transmit service data.

In this embodiment of the present disclosure, the terminal device may keep searching based on the priority of each of the K unlicensed cells until a cell in the idle state #1 is found, and transmit the control data in the found cell.

In other words, in this embodiment of the present disclosure, the terminal device determines that there are at least two cells that can be used to transmit the control data, that is, the K unlicensed cells obtained by the terminal device include at least two cells. However, the cells included in the K unlicensed cells have different priorities for transmitting the control data. For example, the K unlicensed cells include a cell #1, a cell #2, and a cell #3, and all the three cells can be used to transmit the control data. The three cells are sorted in descending order of the priorities for transmitting the control data: the cell #1, the cell #2, and the cell #3. If in the transmission time period of the control data, the cell #1 is in the busy state #1, and the cell #2 and the cell #3 are in the idle state #1, the cell #2 and/or the cell #3 may be corresponding to the target cell in this embodiment of the present disclosure.

Optionally, the terminal device may further determine, based on a priority rule, the target cell used to transmit the control data. For example, the terminal device may use, as the target cell, a cell that is in the idle state #1 and that has a highest priority, namely, the cell #2 in this example. Alternatively, the terminal device may use, as the target cell, a cell that is in the idle state #1 and that has a lowest priority, namely, the cell #3 in this example. Alternatively, the terminal device may further determine the target cell based on another preset rule. This is not specifically limited in this embodiment of the present disclosure.

As an example instead of limitation, in this embodiment of the present disclosure, a status of a cell may be determined by using a technology such as listen before talk (LBT, Listen Before Talk).

For example, in this embodiment of the present disclosure, the terminal device may detect, by using, for example, a clear channel assessment (CCA, Clear Channel Assessment) process, whether a cell (or a channel of a cell) is occupied in a period of time or whether a cell can be used, to determine a status of the cell. The status of the cell may be that the cell (or a frequency band corresponding to the cell) is in an idle state or that the cell (or a frequency band corresponding to the cell) is in a busy state. In addition, the foregoing CCA process may be implemented through signal detection and/or energy detection. For example, when the status of the cell is determined through signal detection, correspondingly, if a particular signal (for example, in a Wi-Fi system, the particular signal may be a preamble) is not detected, the detected cell may be determined to be in an idle state, and the terminal device can transmit data in the detected cell. When the status of the cell is determined through energy detection, correspondingly, if energy received or detected by the terminal device on a frequency band corresponding to the cell is lower than a threshold, the detected cell may be determined to be in an idle state, and the terminal device can transmit data in the cell.

In this embodiment of the present disclosure, the frequency band corresponding to the cell may be construed as a frequency band used by the cell.

In this embodiment of the present disclosure, the determining whether a cell (or a channel of a cell) can be used may alternatively be construed as whether the terminal device can transmit data in the detected cell. The determining, by the terminal device, whether a cell or a channel of a cell can be used may alternatively be construed as determining, by the terminal device, whether a frequency band corresponding to the cell can be used. For example, if the frequency band corresponding to the detected cell is an unlicensed frequency band, the terminal device may detect whether the unlicensed frequency band can be used. If the terminal device determines that the detected cell is in an idle state, or determines that the unlicensed frequency band corresponding to the detected cell is in an idle state, the terminal device can transmit data in the detected cell.

Generally, in an example, a status of the cell #A is determined according to the first preset rule.

For example, when determining the status of the cell #A through clear channel assessment implemented based on signal detection, the terminal device may detect whether there is a particular first signal (namely, a signal specified in the first preset rule) such as a preamble (Preamble) on a frequency band corresponding to the cell #A. In this embodiment of the present disclosure, the first signal may be determined according to standard specifications or local laws and regulations, may be indicated by the network device, or may be determined in another manner. This is not specifically limited in this embodiment of the present disclosure.

If the particular first signal is detected, the terminal device may determine that the cell #A is in the busy state #1 and cannot be used to transmit the control data. In this case, the cell #A cannot be used as the target cell.

If the particular first signal is not detected, the terminal device may determine that the cell #A is in the idle state #1 and can be used to transmit the control data. In this case, the cell #A can be used as the target cell.

For another example, when determining the status of the cell #A through clear channel assessment implemented based on energy detection, the terminal device may detect energy on a frequency band corresponding to the cell #A.

If the received or detected energy is higher than a particular first energy threshold, the terminal device may determine that the cell #A is in the busy state #1 and cannot be used to transmit the control data. In this case, the cell #A cannot be used as the target cell.

If the received or detected energy is not higher than a particular first energy threshold, the terminal device may determine that the cell #A is in the idle state #1 and can be used to transmit the control data. In this case, the cell #A can be used as the target cell.

In this embodiment of the present disclosure, the first energy threshold may be determined according to standard specifications or local laws and regulations, may be indicated by the network device, or may be determined in another manner. This is not specifically limited in this embodiment of the present disclosure.

Herein, it should be noted that, the foregoing enumerated status of the cell is a status based on a determining rule (namely, an example of the first preset rule) for the control data.

In this embodiment of the present disclosure, there may also be a determining rule (namely, an example of a second preset rule) for service data.

In this case, optionally, the target cell is in a busy state according to the second preset rule, and the second preset rule is a rule used to determine whether a cell can be used to transmit service data.

Specifically, in this embodiment of the present disclosure, the rule used to determine whether a cell can be used to transmit control data (namely, the first preset rule) may be different from the rule used to determine whether a cell can be used to transmit service data (namely, the second preset rule).

The status of a cell according to the second preset rule (or, with regard to service data) may include a busy state (which is marked as a busy state #2 hereinafter for ease of understanding and differentiation) specific to the service data and an idle state (which is marked as an idle state #2 hereinafter for ease of understanding and differentiation) specific to the service data.

In this embodiment of the present disclosure, whether a cell can be used to transmit service data may be determined by using a technology such as LBT.

For example, the terminal device may detect whether there is a particular second signal (namely, a single specified in the second preset rule) such as a preamble on a frequency band corresponding to the cell #A. In this embodiment of the present disclosure, the second signal may be determined according to standard specifications or local laws and regulations, may be indicated by the network device, or may be determined in another manner. This is not specifically limited in this embodiment of the present disclosure.

If the particular second signal is detected, the terminal device may determine that the cell #A is in the busy state #2 and cannot be used to transmit service data.

If the particular second signal is not detected, the terminal device may determine that the cell #A is in the idle state #2 and can be used to transmit service data.

For another example, when determining the status of the cell #A, the terminal device may detect energy on a frequency band corresponding to the cell #A.

If the received or detected energy is higher than a particular second energy threshold, the terminal device may determine that the cell #A is in the busy state #1 and cannot be used to transmit the control data.

If the received or detected energy is not higher than a particular second energy threshold, the terminal device may determine that the cell #A is in the idle state #1 and can be used to transmit the control data.

In this embodiment of the present disclosure, the second energy threshold may be determined according to standard specifications or local laws and regulations, may be indicated by the network device, or may be determined in another manner. This is not specifically limited in this embodiment of the present disclosure.

The second energy threshold may be less than the first energy threshold.

That is, in this embodiment of the present disclosure, the cell #A may be in an idle state (namely, the idle state #1) according to the first preset rule for the control data, so that the cell #A can be used to transmit the control data.

In addition, the cell #A may alternatively be in an idle state (namely, the idle state #2) according to the second preset rule for the service data, so that the cell #A can be used to transmit the service data.

Alternatively, the cell #A may be in a busy state (namely, the busy state #2) according to the second preset rule for the service data, so that the cell #A cannot be used to transmit the service data.

In the prior art, for control data and service data, only a same rule is used to determine whether a cell can be used (or whether a cell is idle), and consequently, if a terminal device determines, based on the rule, that the cell cannot be used to transmit the service data, the terminal device does not transmit the control data in the cell either. In comparison, in this embodiment of the present disclosure, different rules are used to determine whether a cell can be used to transmit control data or service data. In the rules, a requirement on a cell for transmitting the control data is lower than a requirement on the cell for transmitting the service data. That is, a probability of determining, according to a first preset rule corresponding to control data transmission, that a cell or an unlicensed frequency band corresponding to a cell is in an idle state is higher than a probability of determining, according to a second preset rule corresponding to service data transmission, that the cell or the unlicensed frequency band corresponding to the cell is in an idle state.

For example, the first energy threshold is set to be higher than the second energy threshold, to flexibly adapt to transmission of the service data and transmission of the control data, and increase a transmission opportunity of the control data. This further improves practical applicability and an effect of the present disclosure.

It should be understood that, the foregoing enumerated methods for determining whether a cell is idle and the parameters used are merely examples, and the present disclosure is not limited thereto. For example, minimum listening time may alternatively be used to determine whether a cell is idle. The minimum listening time is shortest listening time required to determine whether a cell (specifically, a channel of the cell) is idle, for example, listening time required by a device to determine whether a detected channel is available, or whether a detected unlicensed spectrum resource is idle, or whether a detected cell is idle. Usually, the listening time includes self-defer (Self-defer) time and time indicated by an integer quantity of timeslots (timeslot). One listening timeslot may be 9 μs or another value, and this is not limited in this embodiment of the present disclosure. Further, during the listening time, a quantity of listening timeslots may be randomly selected from a contention window (CW, Contention Window) range. For example, the quantity of listening timeslots is randomly selected from the following set: [0, CWS-1], and elements included in a set [X, Y] are greater than or equal to X and less than or equal to Y. CWS indicates a contention window size (CW Size). With reference to the foregoing description, in this embodiment of the present disclosure, a clear channel assessment mechanism with a higher priority may include a higher energy detection threshold and/or shorter listening time. The shorter listening time may include a smaller quantity of listening timeslots and/or shorter self-defer time. Alternatively, usually, for a same channel, a device using a clear channel assessment mechanism with a high priority determines that the detected channel is available more easily and/or earlier than a device using a clear channel assessment mechanism with a low priority does. For example, the device using the clear channel assessment mechanism with a high priority can determine that the detected channel is available, but the device using the clear channel assessment mechanism with a low priority cannot determine that the detected channel is available. Description of a same or similar case is omitted below. In this embodiment of the present disclosure, optionally, a priority of the first preset rule is higher than a priority of the second preset rule.

In the foregoing specific implementation, a requirement on a cell for determining whether the cell can be used to transmit control data is lower than a requirement on the cell for determining whether the cell can be used to transmit service data. Correspondingly, the foregoing specific implementation is merely an example, and the present disclosure is not limited thereto. For example, a same energy threshold may be used in the first preset rule and the second preset rule, but listening time in the first preset rule may be less than listening time in the second preset rule. For example, one-shot LBT is used in the first preset rule, and normal LBT is used in the second preset rule. That is, minimum listening time used to determine whether a cell can be used to transmit control data may be set to be less than minimum listening time used to determine whether the cell can be used to transmit service data.

Manner β

For another example, the preset condition may alternatively be a determining condition that is based on a transmission time range (such as a time range of maximum channel occupancy time or a time range of a transmission opportunity) of a cell.

In this case, for example, the preset condition may be: A transmission time period of the control data may be within a transmission time range corresponding to the cell #A.

That is, optionally, before the transmitting, by the terminal device, control data in the target cell, the method includes:

determining, by the terminal device, that the transmission time period of the control data is within a transmission time range corresponding to the target cell, where the transmission time range is a time range corresponding to maximum channel occupancy time (MCOT, Maximum Channel Occupancy Time) or a time range corresponding to one transmission opportunity (TXOP, Transmission Opportunity).

Specifically, in this embodiment of the present disclosure, the terminal device may determine the transmission time period of the to-be-sent control data. As an example instead of limitation, in this embodiment of the present disclosure, the transmission time period may be defined by any two parameters of transmission start time, transmission end time, and transmission duration. The transmission time period may include an integer quantity of orthogonal frequency division multiplexing (OFDM, Orthogonal Frequency Division Multiplexing) symbols, or may include an integer quantity of subframes (Subframe). As an example instead of limitation, it is assumed that the control data is to be transmitted in a subframe n, that is, the transmission time period of the control data is a time period corresponding to the subframe n. In other words, the transmission time period of the control data may be represented by the subframe n. For another example, assuming that the control data is to be transmitted in a timeslot m, the transmission time period of the control data may be represented by the timeslot m. It should be noted that, in this embodiment of the present disclosure, the transmission time period of the control data may be construed as a time unit for transmitting the control data. For example, if the control data can be transmitted in a subframe n, the subframe n may be construed as the data transmission unit for transmitting the control data.

In addition, in this embodiment of the present disclosure, the terminal device may determine the transmission time range corresponding to the cell #A.

Figure 3:
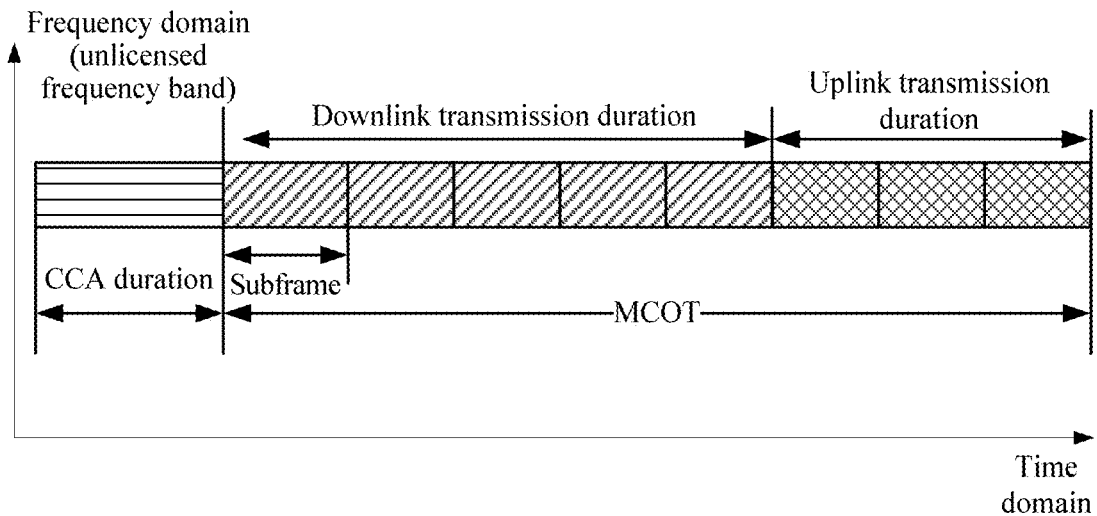
FIG. 3 is a schematic diagram of an example structure of MCOT.

In this embodiment of the present disclosure, the transmission time range corresponding to the cell #A may include a time range corresponding to maximum channel occupancy time (MCOT, Maximum Channel Occupancy Time) used for performing communication in the cell #A by the network device corresponding to the terminal device, or may include a time range corresponding to MCOT used for performing communication in the cell #A by a terminal device (the terminal device herein may include the foregoing terminal device, and may further include another terminal device, such as a terminal device served by the same network device. If one network device serves a plurality of cells, even though a plurality of terminal devices are served by different cells of the plurality of cells, the plurality of terminal devices may be considered to be served by the same network device). In this embodiment of the present disclosure, the network device corresponding to the terminal device may be construed as a network device that can provide a data service for the terminal device, such as a serving base station of the terminal device, or a cell served by a serving base station of the terminal device. For example, in the case of CA, a PCell and/or an SCell configured for the terminal device may be used to transmit control and/or service data for the terminal device, and may also be used to transmit a reference signal or the like. The PCell and/or the SCell may be considered as a serving cell or serving cells of the terminal device. In this embodiment of the present disclosure, the serving cell may also be considered as a network device. That the network device performs communication in the cell #A may be construed as that the network device performs communication or transmits data on an unlicensed frequency band corresponding to the cell #A. The MCOT used for performing communication in the cell #A by the network device may be construed as maximum time for transmitting, after the network device determines that the unlicensed frequency band corresponding to the cell #A is in an idle state, data by using the unlicensed frequency band corresponding to the cell #A. During this time, the network device may not determine a status of the unlicensed frequency band corresponding to the cell #A by using a contention mechanism such as clear channel assessment (such as LBT). The MCOT may be related to local laws and regulations, or may be defined according to standard specifications. FIG. 3 is provided for easy understanding of the MCOT. It should be noted that, FIG. 3 only shows an example of a data transmission manner, and does not limit a specific location for performing CCA. For example, with respect to the network device, the figure only illustrates that the network device should perform CCA before transmitting downlink data. In addition, when the terminal device is to transmit uplink data on the unlicensed frequency band, the terminal device may also determine a status of the unlicensed frequency band through CCA.

Optionally, the method further includes:

receiving, by the terminal device, transmission time range indication information sent by the network device, where the transmission time range indication information is used to indicate a time range corresponding to MCOT of each unlicensed cell.

That is, in this embodiment of the present disclosure, the network device may deliver, to the terminal device, a time range corresponding to MCOT of each unlicensed cell (which includes the cell #A) provided by the network device. That is, the network device may deliver, to the terminal device, a time range corresponding to MCOT of each of the at least one unlicensed cell obtained by the terminal device. Time ranges corresponding to MCOT of the unlicensed cells may be the same or different.

As an example instead of limitation, the transmission time range indication information may be used to indicate start time of the MCOT of each unlicensed cell, so that the terminal device can determine, based on the start time of the MCOT of each unlicensed cell and MCOT duration specified in a system, the time range corresponding to the MCOT of each unlicensed cell.

Alternatively, the transmission time range indication information may be used to indicate start time and end time of the MCOT of each unlicensed cell, so that the terminal device can determine, based only on the transmission time range indication information, the time range corresponding to the MCOT of each unlicensed cell.

It should be understood that, the foregoing enumerated methods for determining the time range corresponding to the MCOT of each unlicensed cell by the terminal device are merely examples, and the present disclosure is not limited thereto. For example, the terminal device may alternatively determine start time of the MCOT of each unlicensed cell through, for example, blind detection, and determine, based on the start time of the MCOT of each unlicensed cell and MCOT duration specified in a system, the time range corresponding to the MCOT of each unlicensed cell.

Figure 4:
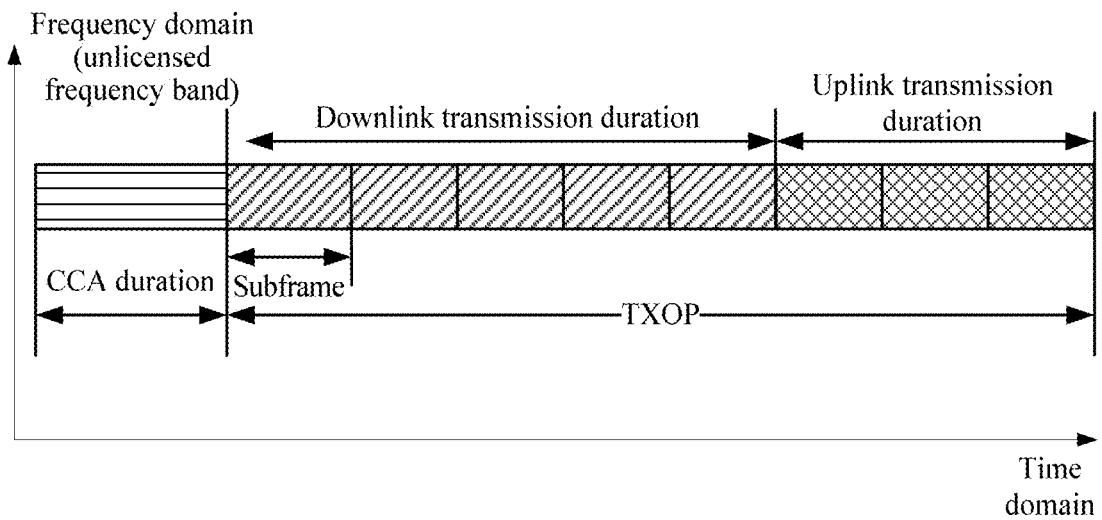
FIG. 4 is a schematic diagram of an example structure of a TXOP.

In this embodiment of the present disclosure, the transmission time range corresponding to the cell #A may include a time range corresponding to a transmission opportunity (TXOP, Transmission Opportunity) used for communication in the cell #A, or may include a time range corresponding to a TXOP used by a terminal device to perform communication in the cell #A (the terminal device herein may include the foregoing terminal device, and may further include another terminal device, such as a terminal device served by the same network device. If one network device serves a plurality of cells, even though a plurality of terminal devices are served by different cells of the plurality of cells, the plurality of terminal devices may be considered to be served by the same network device). In this embodiment of the present disclosure, the network device corresponding to the terminal device may be construed as a network device that can provide a data service for the terminal device, such as a serving base station of the terminal device, or a cell served by a serving base station of the terminal device. For example, in the case of CA, a PCell and/or an SCell configured for the terminal device may be used to transmit control and/or service data for the terminal device, and may also be used to transmit a reference signal or the like. The PCell and/or the SCell may be considered as a serving cell or serving cells of the terminal device. In this embodiment of the present disclosure, the serving cell may also be considered as a network device. That the network device performs communication in the cell #A may be construed as that the network device performs communication or transmits data on an unlicensed frequency band corresponding to the cell #A. TXOP used by the network device to perform communication in the cell #A may be construed as maximum time for transmitting, after the network device determines that the unlicensed frequency band corresponding to the cell #A is in an idle state, data by using the unlicensed frequency band corresponding to the cell #A. During this time, the network device may not determine, by using a contention mechanism such as clear channel assessment (such as LBT), a status of the unlicensed frequency band corresponding to the cell #A. The TXOP may be related to local laws and regulations, or may be defined according to standard specifications. FIG. 4 is provided for easy understanding of the TXOP. It should be noted that, FIG. 4 only shows an example of a data transmission manner, and does not limit a specific location for performing CCA. For example, with respect to the network device, the figure only illustrates that the network device should perform CCA before transmitting downlink data. In addition, when the terminal device is to transmit uplink data on an unlicensed frequency band, the terminal device may also determine a status of the unlicensed frequency band through CCA.

Optionally, the method further includes:

receiving, by the terminal device, time range indication information sent by the network device, where the transmission time range indication information is used to indicate a time range corresponding to a TXOP of each unlicensed cell.

That is, in this embodiment of the present disclosure, the network device may deliver, to the terminal device, a time range corresponding to a TXOP, provided by the network device, of each unlicensed cell (which includes the cell #A). That is, the network device may deliver, to the terminal device, a time range corresponding to a TXOP, obtained by the terminal device, of each of the at least one unlicensed cell. Time ranges corresponding to TXOPs of the unlicensed cells may be the same or different.

As an example instead of limitation, the transmission time range indication information may be used to indicate start time of the TXOP of each unlicensed cell, so that the terminal device can determine, based on the start time of the TXOP of each unlicensed cell and TXOP duration specified in a system, the time range corresponding to the TXOP of each unlicensed cell.

Alternatively, the transmission time range indication information may be used to indicate start time and end time of the TXOP of each unlicensed cell, so that the terminal device can determine, based only on the transmission time range indication information, the time range corresponding to the TXOP of each unlicensed cell.

It should be understood that, the foregoing enumerated methods for determining the time range corresponding to the TXOP of each unlicensed cell by the terminal device are merely examples, and the present disclosure is not limited thereto. For example, the terminal device may alternatively determine start time of the TXOP of each unlicensed cell through, for example, blind detection, and determine, based on the start time of the TXOP of each unlicensed cell and TXOP duration specified in a system, the time range corresponding to the TXOP of each unlicensed cell.

Then, the terminal device may determine whether the transmission time period (such as the subframe n) of the control data is within the determined transmission time range corresponding to the cell #A. For example, the terminal device may determine whether both the start time and the end time of the transmission time period are within the transmission time range corresponding to the cell #A.

Optionally, the terminal device may alternatively determine, based on indication information of the network device or detection performed by the terminal device, the transmission time range corresponding to the cell #A. MCOT is used as an example. In an optional manner, the network device directly informs the terminal device of a time range corresponding to the MCOT. For example, the network device sends indication information to inform the terminal device of end time of the MCOT. After receiving the indication information, the terminal device can determine the time range corresponding to the MCOT. Alternatively, the user equipment may detect start time allocated by the network device for data transmission on the unlicensed frequency band, to determine the time range corresponding to the MCOT based on MCOT duration specified by standard protocol specifications or local laws and regulations.

In this way, if the transmission time period (such as the subframe n) of the control data is within the determined transmission time range corresponding to the cell #A, the terminal device may transmit the control data in the cell #A. In this case, the cell #A can be used as the target cell.

If the transmission time period (such as the subframe n) of the control data is not within the determined transmission time range corresponding to the cell #A (for example, at least one of a start time and an end time of the transmission time period is not within the transmission time range corresponding to the cell #A), the terminal device does not transmit the control data in the cell #A. In this case, the cell #A cannot be used as the target cell.

In addition, in this case, the terminal device may give up transmitting the control data.

Optionally, a priority of the target cell is lower than a priority of a second cell of the at least one unlicensed cell, and a transmission time range corresponding to the second cell does not include the transmission time period.

Specifically, the terminal device may alternatively select, from the K unlicensed cells, a cell other than the cell #A (namely, an example of the second cell), for example, a cell whose priority is lower than that of the cell #A (such as the cell #B).

In this case, the terminal device may directly transmit the control data in the cell # B, and in this case, the cell # B can be used as the target cell.

Alternatively, the terminal device may determine whether the transmission time period of the control data is within a determined transmission time range corresponding to the cell # B, and determine, based on the determining result, whether to transmit the control data in the cell # B. A specific process is similar to the determining and processing process of the cell #A. Herein, to avoid repetition, details thereof are omitted.

That is, in this embodiment of the present disclosure, the terminal device may keep searching based on the priority of each of the at least one unlicensed cell until a cell whose corresponding transmission time range includes the transmission time period of the control data is found, and transmit the control data in the found cell. It should be noted that, in this embodiment of the present disclosure, priorities may be sorted in descending order, in ascending order, or in another predefined manner or a manner indicated by the network device. This is not specifically limited.

It should be understood that, the foregoing enumerated setting manners of the preset condition are merely examples, and the present disclosure is not limited thereto. For example, the preset condition may alternatively be a relationship between required transmit power for the control data and maximum allowed transmit power of each of the unlicensed cell. In this case, if the required transmit power for the control data is less than maximum allowed transmit power of the cell #A, the terminal device may determine that the preset condition is met, that is, the terminal device may transmit the control data in the cell #A. In this embodiment of the present disclosure, the maximum allowed transmit power of each cell may be construed as maximum allowed transmit power on a frequency band corresponding to each cell, or maximum transmit power allowed when the network device corresponding to the terminal device performs data transmission on the frequency band.

According to the method for transmitting control data in this embodiment of the present disclosure, the target cell is determined based on the priority of each of the at least one unlicensed cell. This can reduce processing burden of the terminal device and shorten time for determining the target cell.

In addition, after the target cell is determined, whether the target cell meets the preset condition is further determined. This can ensure that the target cell meets a transmission requirement of the control data, and can improve communication reliability.

Manner B

In this embodiment of the present disclosure, the preset condition may be that a status of the target cell meets a requirement (namely, Manner B-1), or the preset condition may be that the transmission time period of the control data meets a requirement (namely, Manner B-2). Specific processes of Manner B-1 and Manner B-2 are described in detail below.

Manner B-1

Optionally, the determining, by a terminal device, at least one target cell from at least one unlicensed cell includes:

determining, by the terminal device, the target cell from the at least one unlicensed cell according to a first preset rule, where the target cell is a cell that is in an idle state according to the first preset rule, and the first preset rule is a rule used to determine whether a cell can be used to transmit control data.

Specifically, in this embodiment of the present disclosure, the terminal device may determine statuses of all of the K unlicensed cells simultaneously or one by one (for example, in an order of priorities). In this embodiment of the present disclosure, a status of a cell according to the first preset rule may include a busy state specific to the control data (namely, the busy state #1) and an idle state specific to the control data (namely, the idle state #1).

Herein, a method and a process for determining a status, based on the first preset rule, of each of the K unlicensed cells by the terminal device may be similar to the method and the process for determining the status, based on the first preset rule, of the cell #A in Manner α. Herein, to avoid repetition, details thereof are omitted.

In this way, the terminal device may determine a cell that is in the idle state #1 from the at least one unlicensed cell.

Herein, the "cell that is in the idle state #1" may be a cell that is in the idle state #1 within the transmission time period of the control data.

It should be noted that, in this embodiment of the present disclosure, that the cell is in the idle state #1 means that the cell can transmit the control data by using an unlicensed spectrum resource, or may be construed as that the cell can send the control data in the transmission time period of the control data by using an unlicensed spectrum resource.

The terminal device may determine a target cell (one or more) from the determined cell (one or more) that is in the idle state #1 (which is marked as a candidate cell hereinafter for ease of understanding and differentiation).

Herein, the terminal device may randomly select one or more cells from the candidate cell as the target cell.

Alternatively, the terminal device may determine the target cell from the candidate cell based on a priority. For example, the terminal device may use, as the target cell, the first t (t≥1) cells of the candidate cells sorted in ascending order of priorities. That is, optionally, the target cell is a highest-priority cell of a cell that is of the at least one unlicensed cell and that is in an idle state according to the first preset rule. Specifically, in this embodiment of the present disclosure, a value of t may be 1, that is, the target cell may be a highest-priority cell of the candidate cell.

Alternatively, the terminal device may determine the determined cell that is in the idle state #1 as the target cell.

It should be noted that, the description about "priority" in Manner A is applicable to a process for determining the target cell from the candidate cell by the terminal device based on the priority. Herein, to avoid repetition, details thereof are omitted.

In this embodiment of the present disclosure, there may also be a determining rule (namely, an example of the second preset rule) for service data.

In this case, optionally, the target cell is in a busy state according to the second preset rule, and the second preset rule is a rule used to determine whether a cell can be used to transmit service data.

Specifically, in this embodiment of the present disclosure, the rule used to determine whether a cell can be used to transmit control data (namely, the first preset rule) may be different from the rule used to determine whether a cell can be used to transmit service data (namely, the second preset rule).

A status of a cell according to the second preset rule (or, with regard to the service data) may include the busy state #2 and the idle state #2.

Herein, a method and a process for determining a status, based on the second preset condition, of a cell by the terminal device may be similar to the method and the process for determining the status, based on the second preset condition, of the cell #A in Manner α. Herein, to avoid repetition, details thereof are omitted.

That is, in this embodiment of the present disclosure, the cell #A may be in an idle state (namely, the idle state #1) according to the first preset rule for the control data, so that the cell #A can be used to transmit the control data.

In addition, the cell #A may alternatively be in an idle state (namely, the idle state #2) according to the second preset rule for the service data, so that the cell #A can be used to transmit the service data.

Alternatively, the cell #A may be in a busy state (namely, the busy state #2) according to the second preset rule for the service data, so that the cell #A cannot be used to transmit the service data.

In the prior art, for control data and service data, only a same rule is used to determine whether a cell can be used (or whether a cell is idle), and consequently, if a terminal device determines, based on the rule, that the cell cannot be used to transmit the service data, the terminal device does not transmit the control data in the cell either. In comparison, in this embodiment of the present disclosure, different rules are used to determine whether a cell can be used to transmit control data or service data. In the rules, a requirement on a cell for transmitting the control data is lower than a requirement on the cell for transmitting the service data. That is, a probability of determining, according to a first preset rule corresponding to control data transmission, that a cell or an unlicensed frequency band corresponding to a cell is in an idle state is higher than a probability of determining, according to a second preset rule corresponding to service data transmission, that the cell or the unlicensed frequency band corresponding to the cell is in an idle state. Therefore, flexible adaption to transmission of the service data and the control data can be implemented, and a transmission opportunity of the control data is increased. This further improves practical applicability and an effect of the present disclosure.

Manner B-2

Optionally, the determining, by a terminal device, at least one target cell from at least one unlicensed cell includes:

determining, by the terminal device, a transmission time period of the control data; and determining, by the terminal device, the target cell from the at least one unlicensed cell based on the transmission time period, where the transmission time period is within a transmission time range corresponding to the target cell, and the transmission time range is a time range corresponding to maximum channel occupancy time MCOT or a time range corresponding to one transmission opportunity (TXOP).

Specifically, in this embodiment of the present disclosure, the terminal device may determine the transmission time period of the to-be-sent control data. As an example instead of limitation, in this embodiment of the present disclosure, the transmission time period may be defined by any two parameters of transmission start time, transmission end time, and transmission duration. The transmission time period may include an integer quantity of OFDM symbols, or may include an integer quantity of subframes. As an example instead of limitation, it is assumed that the control data is to be transmitted in a subframe n, that is, the transmission time period of the control data is a time period corresponding to the subframe n.

In addition, in this embodiment of the present disclosure, the terminal device may determine a transmission time range corresponding to each of the K unlicensed cells.

Herein, a method and a process for determining the transmission time range corresponding to each of the K unlicensed cells by the terminal device may be similar to the method and the process for determining the transmission time range corresponding to the cell #A by the terminal device in Manner β. Herein, to avoid repetition, details thereof are omitted.

Then, the terminal device may determine whether the transmission time range corresponding to each of the K unlicensed cells includes (or covers) the transmission time period of the control data (such as the subframe n). That is, the terminal device may determine whether the transmission time period of the control data (such as the subframe n) is within the transmission time range corresponding to each of the K unlicensed cells.

In this way, the terminal device may determine, based on the foregoing determining result from the K unlicensed cells, a cell (one or more) whose corresponding transmission time range includes the transmission time period of the control data (which is marked as a candidate cell hereinafter for ease of understanding and differentiation), and determine the target cell (one or more) from the candidate cell.

Herein, the terminal device may randomly select one or more cells from the candidate cell as the target cell.

Alternatively, the terminal device may determine the target cell from the candidate cell based on a priority. For example, the terminal device may select, from the candidate cell, the first p (p≥1) cells in ascending order of priorities, and use the first p cells as the target cell.

Optionally, the target cell is a highest-priority cell of a cell that is of the at least one unlicensed cell and whose corresponding transmission time range includes the transmission time period.

Specifically, in this embodiment of the present disclosure, a value of p may be 1, that is, the target cell may be a highest-priority cell of the candidate cell.

It should be noted that, the description about "priority" in Manner A is applicable to a process for determining the target cell from the candidate cell by the terminal device based on the priority. Herein, to avoid repetition, details thereof are omitted.

It should be understood that, the foregoing enumerated setting manners of the preset condition are merely examples, and the present disclosure is not limited thereto. For example, the preset condition may alternatively be a relationship between required transmit power for the control data and maximum allowed transmit power of each of the unlicensed cell. In this case, if the required transmit power for the control data is less than maximum allowed transmit power of the cell #C, the terminal device may determine that the preset condition is met, that is, the terminal device may transmit the control data in the cell #C.

According to the method for transmitting control data in this embodiment of the present disclosure, the candidate cell that meets the preset condition is determined, and the target cell is determined from the candidate cell. This can ensure that the target cell meets a transmission requirement of the control data, and can improve communication reliability.

In addition, the target cell is determined from the candidate cell based on the priority. This can reduce processing burden of the terminal device and shorten time for determining the target cell.

It should be understood that, the foregoing enumerated processes for determining the target cell by the terminal device are merely examples, and the present disclosure is not limited thereto. For example, optionally, the determining, by a terminal device, at least one target cell from at least one unlicensed cell includes:

receiving, by the terminal device, second indication information sent by the network device, where the second indication information is used to indicate the target cell; and determining, by the terminal device, the at least one target cell from the at least one unlicensed cell based on the second indication information.

Specifically, in this embodiment of the present disclosure, the network device may deliver the indication information of the target cell to the terminal device, so that the terminal device can determine the target cell based on the indication information.

In addition, when the network device indicates an unlicensed cell set (namely, an example of the at least one unlicensed cell) to the terminal device by delivering configuration information, if the unlicensed cell set includes only one cell (which is specifically a cell that can be used to transmit the control data), processes for obtaining the unlicensed cell set and determining the target cell by the terminal device may be performed at the same time. That is, the terminal device may use, as the target cell, the one unlicensed cell indicated by the network device. As an example instead of limitation, for example, in the case of CA, it is assumed that the network device configures three SCells for the terminal device. The three cells are sorted in ascending order of ScellIndex as follows: a cell #1, a cell #2, and a cell #3. In this case, although the cell #1, the cell #2, and the cell #3 all are capable of carrying the control data, that is, the terminal device can transmit the control data in the cell #1, the cell #2, and the cell #3, the network device may still indicate only the cell #1 to the terminal device for transmitting the control data. In this case, when obtaining indication information indicating the cell #1, the user equipment may determine the cell #1 as the target cell. Preferably, the control data herein includes an HARQ-ACK and/or periodic CSI, and may also include other control data such as aperiodic CSI.

After the target cell is determined as described above, in S220, the terminal device may transmit the control data in the target cell (for example, to the network device).

In this embodiment of the present disclosure, the control data may include uplink control information (UCI, Uplink Control Information). The UCI may include one or more of channel state information (CSI, Channel State Information), hybrid automatic repeat request acknowledgment (HARQ-ACK, HARQ Acknowledgment) information, scheduling request (SR, Scheduling Request) information, or the like. The CSI may include periodic CSI, and may also include aperiodic CSI.

An HARQ-ACK is a feedback on whether a data block transmitted in downlink is correctly received at a UE side, and may include acknowledgment (ACK, Acknowledgment) information or negative acknowledgment (NACK, Negative Acknowledgement) information.

The SR information is information used by the terminal device to request grant from the network device to send uplink data.

The CSI information may include a channel quality indicator (CQI, Channel Quality Indicator), a precoding matrix indicator (PMI, Precoding Matrix Indicator), a rank indicator (RI, Rank Indicator), and the like.

It should be understood that, the foregoing enumerated specific information included in the control data is merely examples, and the present disclosure is not limited thereto.

Optionally, there are at least two target cells.

Specifically, in this embodiment of the present disclosure, there may be a plurality of target cells. For example, the plurality of target cells may be a plurality of cells that are of the unlicensed cell and that are in the idle state #1 according to the first preset rule.

In this case, the terminal device may transmit the control data in each target cell, to reduce processing complexity for the terminal device in a data packetization process.

A PUSCH is used as an example. The terminal device may transmit service data (UL data) on the PUSCH; or, the terminal device may transmit both UL data and the control data (such as UCI) on the PUSCH.

Different data formats are used in the two transmission manners. In addition, the terminal device needs time to packetize data before transmitting the data. Due to an uncertainty in determining a to-be-used unlicensed spectrum resource, prior to a moment of transmitting the control data, the terminal device may not know which cell or cells, included in the obtained at least one unlicensed cell, has or have a corresponding channel that is on an unlicensed frequency band and that is in an idle state at the moment of transmitting the control data. Therefore, the terminal device cannot accurately know which cell is used to transmit both UL data and UCI on a PUSCH, and which cell is used to transmit only UL data on a PUSCH. In the prior art, if UCI should be carried on a PUSCH, the UCI is usually carried only on a PUSCH in one cell. However, in this embodiment of the present disclosure, the UCI may be carried in a plurality of cells. Compared with the solution in which the UCI is always carried in one cell, although data transmission efficiency of some cells is decreased (because only UL data could be transmitted, but to reduce packetization complexity, the terminal device generates a packet in an UL data and UCI multiplexed format), packetization complexity can be reduced. It should be noted that, this implementation is also applicable to the following scenario: for example, the terminal device determines the target cell based on a relationship between the transmission time period of the control data and the MCOT.

Alternatively, in this case, the terminal device may select, from the plurality of (such as X) target cells, one or more (such as Y, where Y≤X) cells to transmit the control data (or both the control data and the service data), and transmits only the service data in another cell, so as to ensure data transmission efficiency.

Optionally, in this case, the terminal device may change a data packetization manner. For example, the terminal device determines that the control data can be transmitted on a PUSCH of a target cell k in a subframe n. In addition, the terminal device also should transmit the service data on the PUSCH at a same moment (such as in the same subframe n). In this case, the terminal device may first transmit the service data on the PUSCH, and then transmit the control data on the PUSCH.

Figure 5:
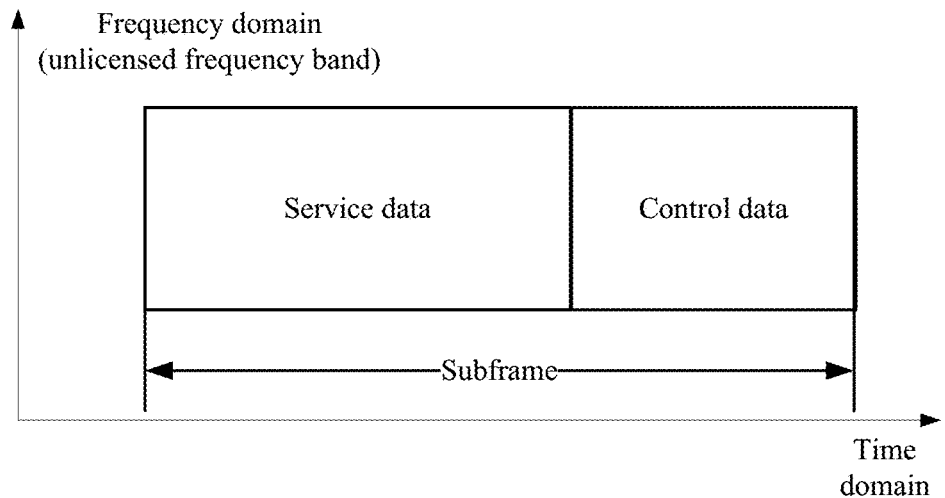
FIG. 5 is a schematic diagram showing a location relationship between control data and service data that are in a same subframe according to an embodiment of the present disclosure.

As an example instead of limitation, FIG. 5 shows a configuration relationship between control data and service data in a same subframe. As shown in FIG. 5, in a same subframe, a time-domain location used for carrying the service data may be prior to a time-domain location used for carrying the control data.

Because transmission time of the control data comes later, time is reserved for data packetization. This can ensure that in another cell, a packet is generated for transmitting only service data, thereby ensuring data transmission efficiency.

In addition, it should be noted that, in this embodiment of the present disclosure, when the control data and the service data are transmitted in a same subframe, a data multiplexing rule in an existing LTE system may alternatively be used to implement multiplexed transmission of the control data and the service data in the same subframe.

For ease of understanding and description, the following details a method and a process for transmitting the control data by the terminal device in one target cell (which is marked as a target cell #1 hereinafter for ease of understanding and differentiation).

In this embodiment of the present disclosure, the terminal device may transmit the control data on a control channel of the target cell #1 (namely, Manner i), or the terminal device may transmit the control data on a shared channel of the target cell #1 (namely, Manner j). The following separately describes the two manners in detail.

Manner i

Optionally, the transmitting, by the terminal device, control data to a network device in the target cell includes:

transmitting, by the terminal device, the control data to the network device on an uplink control channel of the target cell.

Specifically, the terminal device may transmit the control data on a control channel (such as a PUCCH) of the determined target cell #1.

For example, when the terminal device determines that the target cell #1 is in an idle state according to the first preset rule, the terminal device may determine that the control channel (such as the PUCCH) of the target cell #1 is in an idle state, and the terminal device can transmit the control data on the PUCCH of the target cell #1.

In this case, when the target cell #1 is in an idle state according to the second preset rule, that is, when the terminal device determines that a shared channel (such as a PUSCH) of the target cell #1 is in an idle state, the terminal device can also transmit service data on the PUSCH of the target cell #1.

Alternatively, when the target cell #1 is in a busy state according to the second preset rule, that is, when the terminal device determines that a shared channel (such as a PUSCH) of the target cell #1 is in a busy state, the terminal device may not transmit service data on the PUSCH of the target cell #1.

Manner j

Optionally, the transmitting, by the terminal device, control data to a network device in the target cell includes:

transmitting, by the terminal device, the control data to the network device on an uplink shared channel of the target cell; or transmitting, by the terminal device, only the control data to the network device on an uplink shared channel of the target cell.

Specifically, the terminal device may transmit the control data on a shared channel (such as a PUSCH) of the determined target cell #1.

For example, when the terminal device determines that the target cell #1 is in an idle state according to the first preset rule, the terminal device can transmit the control data on the PUSCH of the target cell #1.

In this case, when the target cell #1 is in an idle state according to the second preset rule, that is, when the terminal device determines that a data channel (such as a PUSCH) of the target cell #1 is in an idle state, the terminal device can also transmit service data on the PUSCH of the target cell #1.

That is, the terminal device can transmit the control data and the service data on the PUSCH of the target cell #1. It should be noted that, in this embodiment of the present disclosure, the terminal device may determine a transmission time period of each service data and a sending time period of each control data, and transmit service data and control data whose transmission time periods are the same on the PUSCH.

For example, it is assumed that the terminal device determines the target cell #1 as a cell for transmitting the control data, and determines to transmit the control data in a subframe n. In addition, it is assumed that the subframe n, a subframe n+1, and a subframe n+2 are scheduled for the terminal device to transmit service data (this may be construed as follows: If the terminal device can determine that the target cell #1 is in the idle state #2 in the subframe n, the subframe n+1, and the subframe n+2, the terminal device can transmit the service data in the subframe n, the subframe n+1, and the subframe n+2).

As such, if the terminal device determines (for example, by using the first preset rule mentioned in this embodiment of the present disclosure) that the control data can be transmitted in the subframe n, but determines (for example, by using the second preset rule mentioned in this embodiment of the present disclosure) that the service data cannot be transmitted in the subframe n, the terminal device can transmit the control data on a PUCCH in the subframe n, but cannot transmit, on a PUSCH in the subframe n, the service data for which the subframe n is scheduled;

the terminal device can transmit the control data on a PUSCH in the subframe n, but cannot transmit, on the PUSCH in the subframe n, the service data for which the subframe n is scheduled; or the terminal device can transmit the control data on a PUSCH in the subframe n, and can also transmit, on the PUSCH in the subframe n, the service data for which the subframe n is scheduled.

That is, optionally, the transmitting, by the terminal device, the control data to the network device on an uplink shared channel (such as a PUSCH) of the target cell includes:

transmitting, by the terminal device, the control data and uplink service data to the network device on an uplink service data channel of the target cell when determining that the target cell is in a busy state according to the second preset rule, where the second preset rule is a rule used to determine whether a cell can be used to transmit service data.

Figure 6:
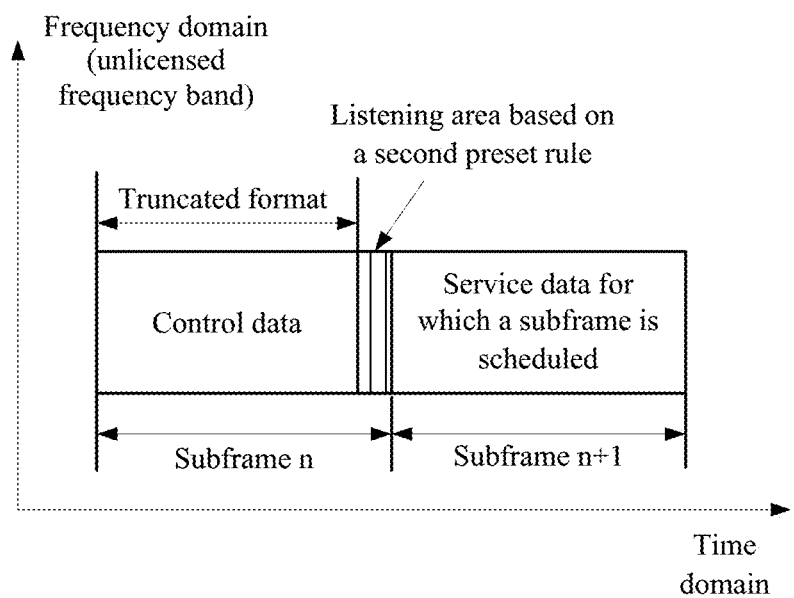
FIG. 6 is a schematic diagram of an example of a manner used for transmitting control data and service data according to an embodiment of the present disclosure.

It should be noted that, in the foregoing case, the terminal device may transmit the control data (either on the PUCCH or on the PUSCH) in a subframe n by using a truncated format, for example, may transmit the control data on the PUCCH and/or the PUSCH of the target cell by using a truncated PUCCH format. In other words, not all orthogonal frequency division multiplexing (Orthogonal Frequency Division Multiplexing, OFDM) symbols included in the subframe n are used to transmit the control data. A benefit of doing so lies in that a listening location can be reserved for data transmission in a subsequent subframe n+1. Correspondingly, if the terminal device should transmit the service data in the subframe n+1, the terminal device may determine a status of the target cell by using the second preset rule, to determine whether transmission can be performed. FIG. 6 shows an example. It is assumed that the terminal device determines the target cell #1 as a cell for transmitting the control data, and determines to transmit the control data in a subframe n. In addition, it is assumed that the subframe n, a subframe n+1, and a subframe n+2 are scheduled for the terminal device to transmit service data (this may be construed as follows: If the terminal device can determine that the target cell #1 is in the idle state #2 in the subframe n, the subframe n+1, and the subframe n+2, the terminal device can transmit the service data in the subframe n, the subframe n+1, and the subframe n+2). If the terminal device determines (based on the determining rule in this embodiment of the present disclosure) that the control data can be transmitted in the subframe n, but the service data cannot be transmitted in the subframe n, in one manner, the terminal device may transmit, in the subframe n, the control data and the service data for which the subframe n is scheduled, but whether the service data can be transmitted in the subframe n+1 should be further determined according to the second preset rule. If that the target cell is in an idle state in the subframe n+1 is determined according to the second preset rule, the terminal device can transmit the service data in the subframe n+1. In the present disclosure, no specific limitation is set on whether the terminal device also should transmit data in the subframe n+1 by using a truncated format, so as to reserve a listening location for subsequent possible uplink data transmission. It should be noted that, FIG. 6 is merely an example, and when transmitting data in the subframe n and the subframe n+1, the terminal device may use all or some frequency resources included in the corresponding subframes.

It should be noted that, in this embodiment of the present disclosure, the uplink service data channel and the uplink shared channel may be construed as a same concept.

In the prior art, when the target cell #1 is in a busy state, the terminal device does not transmit service data in the target cell #1 (specifically, the PUSCH of the target cell #1).

In comparison, in this embodiment of the present disclosure, the terminal device should transmit the control data on the PUSCH of the target cell #1, that is, the target cell #1 is to be occupied by the terminal device. Therefore, when the control data is transmitted in the target cell #1, the service data is transmitted on the PUSCH of the target cell #1. This can increase a utilization rate of the target cell #1, increase signal strength on a channel of the target cell #1, and help another terminal in a system to determine that the target cell #1 is occupied, so that the another terminal does not transmit data in the target cell #1. This can reduce interference and improve transmission accuracy.

It should be noted that, in this embodiment of the present disclosure, optionally, the terminal device is a terminal device that cannot support both PUCCH transmission and PUSCH transmission.

In this embodiment of the present disclosure, optionally, PUCCH resources are independently allocated to different cells included in the unlicensed cell set, and same or different PUCCH resources may be allocated to the different cells.

In this embodiment of the present disclosure, when a same transmission resource is used for uplink control information (UCI) and service data on a PUSCH, optionally, resources (which may be represented by Beta-offset) used for both UCI and service data on PUSCHs are independently allocated to different cells included in the unlicensed cell set, and same or different resources may be allocated to the different cells.

In this embodiment of the present disclosure, when a same transmission resource is used for UCI and service data on a PUSCH, an existing data packetization manner or a time division multiplexing (TDM, Time Division Multiplexing) manner may be used. As shown in FIG. 5, service data is first transmitted on a PUSCH, and then UCI is transmitted. A benefit of doing so lies in that time can be reserved for transmission of control data such as UCI. For example, the terminal device may determine the target cell before transmitting UCI, instead of multiplexing UCI and possible service data in advance and then transmitting the UCI and the possible service data in the target cell. This can improve data transmission efficiency.

In this embodiment of the present disclosure, the control data may include at least one of an HARQ-ACK, CSI, and an SR, or may include another reference signal. This is not specifically limited herein. Further, when resource multiplexing is needed for transmission of UCI and service data on a PUSCH, the HARQ-ACK may be transmitted only on the PUSCH. The HARQ-ACK is multiplexed with the service data on the PUSCH through punctuation. Therefore, if the HARQ-ACK is transmitted only on the PUSCH, implementation of the terminal device can be simplified, and sending of important uplink control information is also ensured.

In conclusion, in this embodiment of the present disclosure, the terminal device may determine the target cell from the K unlicensed cells (for example, based on an indication of the network device or through random selection), and transmit the control data in the target cell.

Alternatively, in this embodiment of the present disclosure, the terminal device may determine the target cell (such as the highest-priority cell) from the K unlicensed cells based on the priorities, and transmit the control data in the target cell. In this case, before transmitting the control data, the terminal device may further determine that the target cell meets the preset condition. For example, the target cell should be in the idle state #1 (at this moment, the target cell may be in the idle state #2, or may be in the busy state #2). For another example, the transmission time range corresponding to the target cell should cover the transmission time period of the control data. In addition, when the highest-priority cell does not meet the preset condition, the terminal device may select, as the target cell, a cell that meets the preset condition from a high-priority cell.

Alternatively, in this embodiment of the present disclosure, the terminal device may determine the target cell from the K unlicensed cells based on the preset condition, and transmit the control data in the target cell. For example, the target cell should be in the idle state #1 (at this moment, the target cell may be in the idle state #2, or may be in the busy state #2). For another example, the transmission time range corresponding to the target cell should cover the transmission time period of the control data. In this case, when there are a plurality of cells that meet the preset condition, the terminal device may further select the target cell (such as a highest-priority cell that meets the preset condition) based on priorities of the cells that meet the condition.

In addition, in this embodiment of the present disclosure, the method for transmitting control data in the present disclosure is performed by the terminal device and is described in detail, but the present disclosure is not limited thereto. The method for transmitting control data in this embodiment of the present disclosure may alternatively be performed by a communications device such as a network device. In addition, a process for performing the method for transmitting control data in this embodiment of the present disclosure by a communications device other than the terminal device may be similar to the process for performing the method for transmitting control data in this embodiment of the present disclosure by the terminal device. Herein, to avoid repetition, details thereof are omitted.

It should be noted that, in this embodiment of the present disclosure, the transmission time period of the control data may be fixed or may be changed, and no specific limitation is set. For example, if the control data includes an uplink HARQ-ACK, and in an FDD system, according to current LTE protocol specifications, if the terminal device detects, in a subframe n−4, a downlink data transmission channel corresponding to the terminal device, such as a PDCCH, an enhanced PDCCH (EPDCCH, Enhanced PDCCH), or a physical downlink shared channel (PDSCH, Physical Downlink Shared Channel), the terminal device transmits the uplink HARQ-ACK in a subframe n.

Correspondingly, in this embodiment of the present disclosure, the transmission time period of the control data may alternatively be set to be the subframe n (that is, the transmission time period of the control data is fixed, similar to that in the prior art). That is, the terminal device may still transmit the uplink HARQ-ACK in the subframe n.

Alternatively, in this embodiment of the present disclosure, the transmission time period of the control data may be set to be another subframe following the subframe n, such as a subframe n+1 (that is, the transmission time period of the control data is not fixed). That is, the terminal device may transmit the uplink HARQ-ACK in a time period corresponding to a subframe following the subframe n.

It should be understood that, the FDD system is used as an example above. However, the present disclosure is not limited thereto, and the method is also applicable to a TDD system.

If the control data includes periodic CSI, according to current LTE protocol specifications, the terminal device transmits the CSI in a CSI feedback time period configured by the network device. Assuming that the terminal device determines, based on a network configuration, to transmit the periodic CSI in a subframe n, in this embodiment of the present disclosure, apart from the subframe n, the periodic CSI may also be transmitted in a subframe following the subframe n.

For another example, if the control data includes aperiodic CSI, and in an FDD system, according to current LTE protocol specifications, if the network device triggers, in a subframe n–4 by using the aperiodic CSI, the terminal device to send the aperiodic CSI, the terminal device sends the aperiodic CSI in a subframe n. In this embodiment of the present disclosure, apart from the subframe n, the aperiodic CSI may also be transmitted in a subframe following the subframe n.

In this embodiment of the present disclosure, the control data may alternatively include data transmitted on a control channel. For uplink data transmission, the control channel may include at least one of the following: a PUCCH, a physical random access channel (PRACH, Physical Random Access Channel), and another control data channel supported by an LTE system. For downlink data transmission (correspondingly, this embodiment of the present disclosure is executed by a network device), the control channel may include at least one of the following: a physical downlink control channel (Physical Downlink Control Channel, PDCCH), a physical control format indicator channel (Physical Control Format Indicator Channel, PCFICH), a physical hybrid automatic repeat request indicator channel (Physical Hybrid Automatic Repeat Request Indicator Channel, PHICH), an enhanced physical downlink control channel (Enhanced Physical Downlink Control Channel, EPDCCH), a physical broadcast channel (Physical Broadcast Channel, PBCH), or another control data channel supported by an LTE system. The control data is data carried on a control channel. In addition, the control data may also include a reference signal.

In this embodiment of the present disclosure, the service data may alternatively include data transmitted on a shared channel. For uplink data transmission, the shared channel may include at least one of the following: a PUSCH and another service data channel supported by an LTE system. For downlink data transmission (correspondingly, this embodiment of the present disclosure is executed by a network device), the shared channel may include at least one of the following: a physical downlink shared channel (Physical Downlink Shared Channel, PDSCH), a physical multicast channel (Physical Multicast Channel, PMCH), or another service data channel supported by an LTE system. The service data is data carried on a shared channel. In addition, a reference signal may also be carried on a shared channel.

In addition, in this embodiment of the present disclosure, the network device may receive, through blind detection in the N unlicensed cells (including the target cell) that are served by the network device, the control data (or both the control data and the service data) sent by the terminal device. Alternatively, the network device may determine the target cell from N unlicensed cells (a specific manner may be similar to the manner used by the terminal device to determine the target cell), and receive, in the target cell, the control data sent by the terminal device.

According to the method for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

Figure 7:
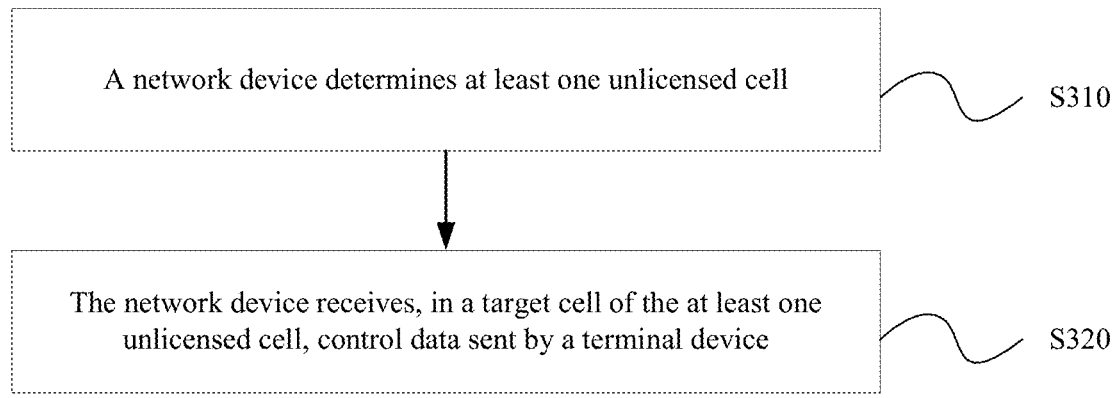
FIG. 7 is a schematic flowchart of a method for transmitting control data according to another embodiment of the present disclosure.

FIG. 7 is a schematic flowchart of a method 300 for transmitting control data that is described from a perspective of a network device according to an embodiment of the present disclosure. As shown in FIG. 7, the method 300 includes the following blocks.

S310. A network device determines at least one unlicensed cell.

S320. The network device receives, in a target cell of the at least one unlicensed cell, control data sent by a terminal device.

Optionally, before the receiving, by the network device in a target cell of the at least one unlicensed cell, control data sent by a terminal device, the method further includes:

sending, by the network device, first indication information to the terminal device, where the first indication information is used to indicate the at least one unlicensed cell.

Optionally, before the receiving, by the network device in a target cell of the at least one unlicensed cell, control data sent by a terminal device, the method further includes:

sending, by the network device, second indication information to the terminal device, where the second indication information is used to indicate the target cell.

Optionally, before the receiving, by the network device in a target cell of the at least one unlicensed cell, control data sent by a terminal device, the method further includes:

sending, by the network device, priority indication information to the terminal device, where the priority indication information is used to indicate a priority of each of the at least one unlicensed cell.

Optionally, before the receiving, by the network device in a target cell of the at least one unlicensed cell, control data sent by a terminal device, the method further includes:

sending, by the network device, transmission time range indication information to the terminal device, where the transmission time range indication information is used to indicate a transmission time range corresponding to each of the at least one unlicensed cell.

Optionally, the target cell is a highest-priority cell of the at least one unlicensed cell.

Optionally, the target cell is a cell that is in an idle state according to a first preset rule, and the first preset rule is a rule used to determine whether a cell can be used to transmit control data.

Optionally, the first preset rule is different from a second preset rule, and the second preset rule is a rule used to determine whether a cell can be used to transmit service data.

Optionally, a transmission time period of the control data is within a transmission time range corresponding to the target cell, and the transmission time range is a time range corresponding to maximum channel occupancy time MCOT or a time range corresponding to one transmission opportunity (TXOP).

Optionally, there are at least two target cells.

Optionally, the receiving, by the network device in a target cell of the at least one unlicensed cell, control data sent by a terminal device includes:

receiving, by the network device on a control data channel of the target cell, the control data sent by the terminal device.

Optionally, the receiving, by the network device in a target cell of the at least one unlicensed cell, control data sent by a terminal device includes:

receiving, by the network device on a service data channel of the target cell, the control data sent by the terminal device.

Optionally, the receiving, by the network device on a service data channel of the target cell, the control data sent by the terminal device includes:

receiving, by the network device on the service data channel of the target cell, the control data and service data that are sent by the terminal device, where the target cell is in a busy state according to the second preset rule, and the second preset rule is a rule used to determine whether a cell can be used to transmit service data.

Optionally, an uplink control channel is configured for at least one cell of the at least one unlicensed cell.

The actions of the network device in the method 300 are similar to the actions of the network device in the method 200, and the actions of the terminal device in the method 300 are similar to the actions of the terminal device in the method 200. Herein, to avoid repetition, detailed description thereof is omitted.

According to the method for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

The methods for transmitting control data provided in the embodiments of the present disclosure are described above in detail with reference to FIG. 1 to FIG. 7. Apparatuses for transmitting control data provided in the embodiments of the present disclosure are described below in detail with reference to FIG. 8 and FIG. 9.

Figure 8:
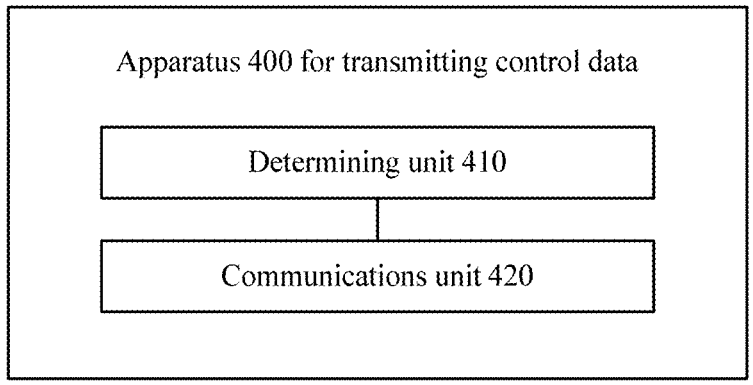
FIG. 8 is a schematic block diagram of an apparatus for transmitting control data according to an embodiment of the present disclosure.

FIG. 8 is a schematic block diagram of an apparatus 400 for transmitting control data according to an embodiment of the present disclosure. As shown in FIG. 8, the apparatus 400 includes:

a determining unit 410, configured to determine at least one target cell from at least one unlicensed cell; and a communications unit 420, configured to transmit control data in the target cell.

Optionally, the determining unit is specifically configured to: determine a priority of each of the at least one unlicensed cell; and determine the at least one target cell from the at least one unlicensed cell based on the priority of each of the at least one unlicensed cell.

Optionally, the determining unit is specifically configured to determine the priority of each of the at least one unlicensed cell based on an index number of each of the at least one unlicensed cell.

Optionally, the target cell is a highest-priority cell of the at least one unlicensed cell.

Optionally, the determining unit is specifically configured to determine the target cell from the at least one unlicensed cell according to a first preset rule, where the target cell is a cell that is in an idle state according to the first preset rule, and the first preset rule is a rule used to determine whether a cell can be used to transmit control data.

Optionally, the first preset rule is different from a second preset rule, and the second preset rule is a rule used to determine whether a cell can be used to transmit service data.

Optionally, the target cell is in a busy state according to the second preset rule.

Optionally, the target cell is a highest-priority cell of a cell that is of the at least one unlicensed cell and that is in an idle state according to the first preset rule.

Optionally, a priority of the target cell is lower than a priority of a first cell of the at least one unlicensed cell, and the first cell is in a busy state according to the first preset rule.

Optionally, the communications unit is further configured to receive priority indication information sent by a network device, where the priority indication information is used to indicate the priority of each of the at least one unlicensed cell; and the determining unit is specifically configured to determine the priority of each of the at least one unlicensed cell based on the priority indication information.

Optionally, the determining unit is specifically configured to: determine a transmission time period of the control data; and determine the target cell from the at least one unlicensed cell based on the transmission time period, where the transmission time period is within a transmission time range corresponding to the target cell, and the transmission time range is a time range corresponding to maximum channel occupancy time (MCOT) or a time range corresponding to one transmission opportunity (TXOP).

Optionally, the target cell is a highest-priority cell of a cell that is of the at least one unlicensed cell and whose corresponding transmission time range includes the transmission time period.

Optionally, the priority of the target cell is lower than a priority of a second cell of the at least one unlicensed cell, and a transmission time range corresponding to the second cell does not include the transmission time period.

Optionally, the communications unit is further configured to receive transmission time range indication information sent by the network device, where the transmission time range indication information is used to indicate a transmission time range corresponding to each of the at least one unlicensed cell; and the determining unit is specifically configured to determine the target cell from the at least one unlicensed cell based on the transmission time period and the transmission time range indication information.

Optionally, there are at least two target cells.

Optionally, the communications unit is specifically configured to transmit the control data to the network device on a control channel of the target cell.

Optionally, the communications unit is specifically configured to transmit the control data to the network device on a service data channel of the target cell.

Optionally, the communications unit is specifically configured to: when the determining unit determines that the target cell is in a busy state according to the second preset rule, transmit the control data and service data to the network device on the service data channel of the target cell, where the second preset rule is a rule used to determine whether a cell can be used to transmit service data.

Optionally, an uplink control channel is configured for at least one cell of the at least one unlicensed cell.

Optionally, the communications unit is further configured to receive, first indication information sent by the network device, where the first indication information is used to indicate the at least one unlicensed cell.

Optionally, the communications unit is further configured to receive second indication information sent by the network device, where the second indication information is used to indicate the target cell; and the determining unit is specifically configured to determine the at least one target cell from the at least one unlicensed cell based on the second indication information.

The apparatus 300 for transmitting control data in this embodiment of the present disclosure may be corresponding to the terminal device in the method in the embodiments of the present disclosure. In addition, the units and modules of the apparatus 300 for transmitting control data and the other operations and/or functions are used to implement the corresponding procedure in the method 200 in FIG. 2. For brevity, details are not repeated herein.

According to the apparatus for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

Figure 9:
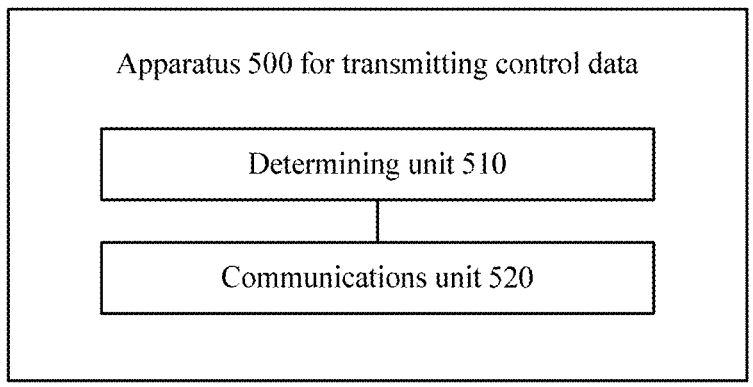
FIG. 9 is a schematic block diagram of an apparatus for transmitting control data according to another embodiment of the present disclosure.

FIG. 9 is a schematic block diagram of an apparatus 500 for transmitting control data according to an embodiment of the present disclosure. As shown in FIG. 9, the apparatus 500 includes:

a determining unit 510, configured to determine at least one unlicensed cell; and a communications unit 520, configured to receive, in a target cell of the at least one unlicensed cell, control data sent by a terminal device.

Optionally, the communications unit is further configured to send first indication information to the terminal device, where the first indication information is used to indicate the at least one unlicensed cell.

Optionally, the communications unit is further configured to send second indication information to the terminal device, where the second indication information is used to indicate the target cell.

Optionally, the communications unit is further configured to send priority indication information to the terminal device, where the priority indication information is used to indicate a priority of each of the at least one unlicensed cell.

Optionally, the communications unit is further configured to send transmission time range indication information to the terminal device, where the transmission time range indication information is used to indicate a transmission time range corresponding to each of the at least one unlicensed cell.

Optionally, the target cell is a highest-priority cell of the at least one unlicensed cell.

Optionally, the target cell is a cell that is in an idle state according to a first preset rule, and the first preset rule is a rule used to determine whether a cell can be used to transmit control data.

Optionally, the first preset rule is different from a second preset rule, and the second preset rule is a rule used to determine whether a cell can be used to transmit service data.

Optionally, a transmission time period of the control data is within a transmission time range corresponding to the target cell, and the transmission time range is a time range corresponding to maximum channel occupancy time (MCOT) or a time range corresponding to one transmission opportunity (TXOP).

Optionally, there are at least two target cells.

Optionally, the communications unit is specifically configured to receive, on a service data channel of the target cell, the control data sent by the terminal device.

Optionally, the communications unit is specifically configured to receive, on the service data channel of the target cell, the control data and service data that are sent by the terminal device, where the target cell is in a busy state according to the second preset rule, and the second preset rule is a rule used to determine whether a cell can be used to transmit service data.

Optionally, an uplink control channel is configured for at least one cell of the at least one unlicensed cell.

The apparatus 500 for transmitting control data in this embodiment of the present disclosure may be corresponding to the network device in the method in the embodiments of the present disclosure. In addition, the units and modules of the apparatus 500 for transmitting control data and the other operations and/or functions are used to implement the corresponding procedure in the method 300 in FIG. 7. For brevity, details are not repeated herein.

According to the apparatus for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

The methods for transmitting control data provided in the embodiments of the present disclosure are described above in detail with reference to FIG. 1 to FIG. 7. Devices for transmitting control data provided in the embodiments of the present disclosure are described below in detail with reference to FIG. 10 and FIG. 11.

Figure 10:
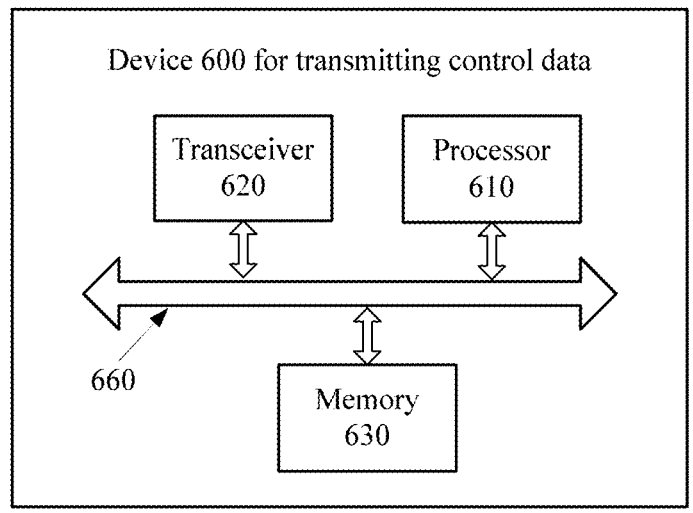
FIG. 10 is a schematic structural diagram of a device for transmitting control data according to an embodiment of the present disclosure.

FIG. 10 is a schematic structural diagram of a device 600 for transmitting control data according to an embodiment of the present disclosure. As shown in FIG. 10, the device 600 includes a processor 610 and a transceiver 620, and the processor 610 and the transceiver 620 are connected. Optionally, the device 600 further includes a memory 630, and the memory 630 is connected to the processor 610. Further, optionally, the device 600 includes a bus system 660. The processor 610, the memory 630, and the transceiver 620 may be connected by using the bus system 660. The memory 630 may be configured to store an instruction. The processor 610 is configured to execute the instruction stored in the memory 630, to control the transceiver 620 to send information or a signal.

The processor 610 is configured to determine at least one target cell from at least one unlicensed cell.

The processor 610 is configured to control the transceiver 620 to transmit control data in the target cell.

Optionally, the processor 610 is specifically configured to: determine a priority of each of the at least one unlicensed cell; and determine the at least one target cell from the at least one unlicensed cell based on the priority of each of the at least one unlicensed cell.

Optionally, the processor 610 is specifically configured to determine the priority of each of the at least one unlicensed cell based on an index number of each of the at least one unlicensed cell.

Optionally, the target cell is a highest-priority cell of the at least one unlicensed cell.

Optionally, the processor 610 is specifically configured to determine the target cell from the at least one unlicensed cell according to a first preset rule, where the target cell is a cell that is in an idle state according to the first preset rule, and the first preset rule is a rule used to determine whether a cell can be used to transmit control data.

Optionally, the first preset rule is different from a second preset rule, and the second preset rule is a rule used to determine whether a cell can be used to transmit service data.

Optionally, the target cell is in a busy state according to the second preset rule.

Optionally, the target cell is a highest-priority cell of a cell that is of the at least one unlicensed cell and that is in an idle state according to the first preset rule.

Optionally, a priority of the target cell is lower than a priority of a first cell of the at least one unlicensed cell, and the first cell is in a busy state according to the first preset rule.

Optionally, the processor 610 is further configured to: control the transceiver 620 to receive priority indication information sent by a network device, where the priority indication information is used to indicate the priority of each of the at least one unlicensed cell; and determine the priority of each of the at least one unlicensed cell based on the priority indication information.

Optionally, the processor 610 is specifically configured to: determine a transmission time period of the control data; and determine the target cell from the at least one unlicensed cell based on the transmission time period, where the transmission time period is within a transmission time range corresponding to the target cell, and the transmission time range is a time range corresponding to maximum channel occupancy time (MCOT) or a time range corresponding to one transmission opportunity (TXOP).

Optionally, the target cell is a highest-priority cell of a cell that is of the at least one unlicensed cell and whose corresponding transmission time range includes the transmission time period.

Optionally, the priority of the target cell is lower than a priority of a second cell of the at least one unlicensed cell, and a transmission time range corresponding to the second cell does not include the transmission time period.

Optionally, the processor 610 is further configured to: control the transceiver 620 to receive transmission time range indication information sent by the network device, where the transmission time range indication information is used to indicate a transmission time range corresponding to each of the at least one unlicensed cell; and determine the target cell from the at least one unlicensed cell based on the transmission time period and the transmission time range indication information.

Optionally, there are at least two target cells.

Optionally, the processor 610 is specifically configured to control the transceiver 620 to transmit the control data to the network device on a control channel of the target cell.

Optionally, the processor 610 is specifically configured to control the transceiver 620 to transmit the control data to the network device on a service data channel of the target cell.

Optionally, the processor 610 is specifically configured to control the transceiver 620 to transmit, when the target cell is in a busy state according to the second preset rule, the control data and service data to the network device on the service data channel of the target cell, where the second preset rule is a rule used to determine whether a cell can be used to transmit service data.

Optionally, an uplink control channel is configured for at least one cell of the at least one unlicensed cell.

Optionally, the processor 610 is specifically configured to control the transceiver 620 to receive first indication information sent by the network device, where the first indication information is used to indicate the at least one unlicensed cell.

Optionally, the processor 610 is specifically configured to: control the transceiver 620 to receive second indication information sent by the network device, where the second indication information is used to indicate the target cell; and determine the at least one target cell from the at least one unlicensed cell based on the second indication information.

The device 600 for transmitting control data in this embodiment of the present disclosure may be corresponding to the terminal device in the method in the embodiments of the present disclosure. In addition, the units and modules of the device 600 for transmitting control data and the other operations and/or functions are used to implement the corresponding procedure in the method 200 in FIG. 2. For brevity, details are not repeated herein.

According to the device for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved. In addition, this can reduce licensed spectrum resource overheads in a communication process, and increase a capacity of a communications system that has a limited quantity of licensed spectrum resources.

Figure 11:
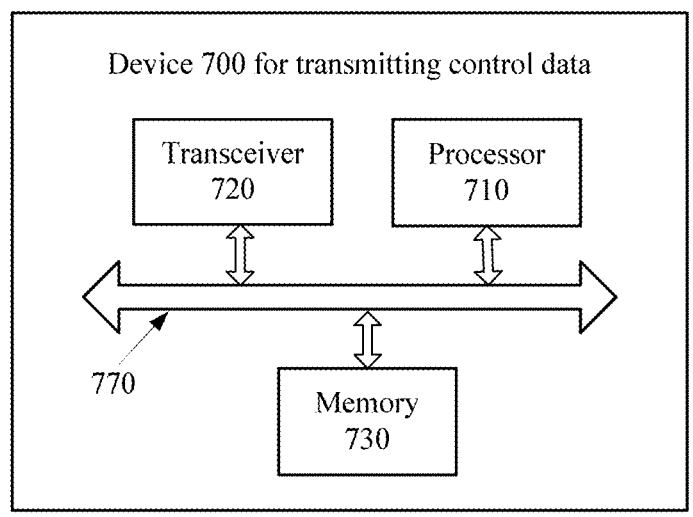
FIG. 11 is a schematic structural diagram of a device for transmitting control data according to another embodiment of the present disclosure.

FIG. 11 is a schematic block diagram of a device 700 for transmitting control data according to an embodiment of the present disclosure. As shown in FIG. 11, the device 700 includes a processor 710 and a transceiver 720, and the processor 710 and the transceiver 720 are connected. Optionally, the device 700 further includes a memory 730, and the memory 730 is connected to the processor 710. Further, optionally, the device 700 includes a bus system 770. The processor 710, the memory 730, and the transceiver 720 may be connected by using the bus system 770. The memory 730 may be configured to store an instruction. The processor 710 is configured to execute the instruction stored in the memory 730, to control the transceiver 720 to send information or a signal.

The processor 710 is configured to determine at least one unlicensed cell.

The processor 710 is configured to control the transceiver 720 to receive, in a target cell of the at least one unlicensed cell, control data sent by a terminal device.

Optionally, the processor 710 is further configured to control the transceiver 720 to send first indication information to the terminal device, where the first indication information is used to indicate the at least one unlicensed cell.

Optionally, the processor 710 is further configured to control the transceiver 720 to send second indication information to the terminal device, where the second indication information is used to indicate the target cell.

Optionally, the processor 710 is further configured to control the transceiver 720 to send priority indication information to the terminal device, where the priority indication information is used to indicate a priority of each of the at least one unlicensed cell.

Optionally, the processor 710 is further configured to control the transceiver 720 to send transmission time range indication information to the terminal device, where the transmission time range indication information is used to indicate a transmission time range corresponding to each of the at least one unlicensed cell.

Optionally, the target cell is a highest-priority cell of the at least one unlicensed cell.

Optionally, the target cell is a cell that is in an idle state according to a first preset rule, and the first preset rule is a rule used to determine whether a cell can be used to transmit control data.

Optionally, the first preset rule is different from a second preset rule, and the second preset rule is a rule used to determine whether a cell can be used to transmit service data.

Optionally, a transmission time period of the control data is within a transmission time range corresponding to the target cell, and the transmission time range is a time range corresponding to maximum channel occupancy time (MCOT) or a time range corresponding to one transmission opportunity (TXOP).

Optionally, there are at least two target cells.

Optionally, the processor 710 is specifically configured to control the transceiver 720 to receive, on a service data channel of the target cell, the control data sent by the terminal device.

Optionally, the processor 710 is specifically configured to control the transceiver 720 to receive, on the service data channel of the target cell, the control data and service data that are sent by the terminal device, where the target cell is in a busy state according to the second preset rule, and the second preset rule is a rule used to determine whether a cell can be used to transmit service data.

Optionally, an uplink control channel is configured for at least one cell of the at least one unlicensed cell.

The device 700 for transmitting control data in this embodiment of the present disclosure may be corresponding to the network device in the method in the embodiments of the present disclosure. In addition, the units and modules of the device 700 for transmitting control data and the other operations and/or functions are used to implement the corresponding procedure in the method 300 in FIG. 7. For brevity, details are not repeated herein.

According to the device for transmitting control data provided in this embodiment of the present disclosure, the terminal device determines the target cell from the at least one unlicensed cell including at least one cell in which an unlicensed frequency band is used, and transmits the control data to the network device in the target cell. This can implement transmission of the control data on an unlicensed spectrum resource, so that the control data can be transmitted not merely on a licensed spectrum resource, and communication reliability and user experience can be improved.

In addition, this can reduce licensed spectrum resource overheads in a communication process, and increase a capacity of a communications system that has a limited quantity of licensed spectrum resources.

It should be noted that, the method embodiments of the present disclosure may be applied to a processor or implemented by a processor. The processor may be an integrated circuit chip and is capable of processing a signal. In an implementation process, the blocks in the method embodiments may be implemented by using a hardware integrated logic circuit in the processor, or by using an instruction in a form of software. The processor may be a general processor, a digital signal processor (Digital Signal Processing, DSP), an application-specific integrated circuit (Application-Specific Integrated Circuit, ASIC), a field programmable gate array (Field Programmable Gate Array, FPGA) or another programmable logic device, a discrete gate or a transistor logic device, or a discrete hardware component. All the methods, blocks, and logical block diagrams disclosed in the embodiments of the present disclosure may be implemented or performed. The general purpose processor may be a microprocessor or the processor may be any normal processor, or the like. The blocks of the methods disclosed in the embodiments of the present disclosure may be directly performed by a hardware decoding processor, or may be performed by using a combination of hardware in a decoding processor and a software module. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the blocks in the methods in combination with hardware of the processor.

It may be understood that, the memory in the embodiments of the present disclosure may be a volatile memory or a nonvolatile memory, or may include both a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external high-speed cache. By way of example rather than restrictive description, RAMs in many forms may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct Rambus random access memory (Direct Rambus RAM, DR RAM). It should be noted that, a memory in a system and the method that are described in this specification is intended to include, but is not limited to, these memories and any other proper types of memories.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, sequence numbers of the foregoing processes do not mean execution orders in various embodiments of the present disclosure. The execution orders of the processes should be determined based on functions and internal logic of the processes, and should not be construed as any limitation on the implementation processes of the embodiments of the present disclosure.

A person of ordinary skill in the art may be aware that, the units and algorithm blocks in the examples described with reference to the embodiments disclosed in this specification may be implemented by electronic hardware or a combination of computer software and electronic hardware. Whether the functions are performed by hardware or software depends on particular application and design constraint conditions of the technical solutions. A person skilled in the art may use a different method to implement the described functions for each particular application, but it should not be considered that the implementation goes beyond the scope of the present disclosure.

It may be clearly understood by a person skilled in the art that, for the purpose of convenient and brief description, for a detailed working process of the system, apparatus, and unit, refer to a corresponding process in the method embodiments. Details are not repeated herein.

In the several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to an actual need to achieve the objectives of the solutions in the embodiments.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the blocks of the methods described in the embodiments of the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing description is merely specific implementations of the present disclosure, but is not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting control data, the method comprising:
    determining, by a terminal device, at least one target cell from at least one unlicensed cell, comprising
        determining, by the terminal device, the at least one target cell from the at least one unlicensed cell based on a first preset rule, wherein the at least one target cell comprises a cell that is in an idle state based on the first preset rule, and wherein the first preset rule comprises a rule used to determine whether a cell is suitable for transmitting the control data; and
    transmitting, by the terminal device, the control data in the target cell.

2. The method of claim 1, wherein the first preset rule is different from a second preset rule, and the second preset rule comprises a rule used to determine whether a cell can be used to transmit service data.

3. The method of claim 1, wherein the target cell comprises a highest-priority cell of a cell that is of the at least one unlicensed cell and that is in an idle state based on the first preset rule.

4. The method of claim 1, wherein a priority of the target cell is lower than a priority of a first cell of the at least one unlicensed cell, and the first cell is in a busy state based on the first preset rule.

5. The method of claim 1, wherein the determining, by a terminal device, at least one target cell from at least one unlicensed cell comprises:
    determining, by the terminal device, a transmission time period of the control data; and
    determining, by the terminal device, the target cell from the at least one unlicensed cell based on the transmission time period, wherein the transmission time period is within a transmission time range corresponding to the target cell, and the transmission time range comprises a time range corresponding to maximum channel occupancy time (MCOT) or a time range corresponding to one transmission opportunity (TXOP).

6. The method of claim 5, wherein the priority of the target cell is lower than a priority of a second cell of the at least one unlicensed cell, and a transmission time range corresponding to the second cell does not comprise the transmission time period.

7. The method of claim 1, wherein there are at least two target cells.

8. The method of claim 1, wherein the transmitting, by the terminal device, control data in the target cell comprises:
    transmitting, by the terminal device, the control data on a service data channel of the target cell.

9. The method of claim 8, wherein the transmitting, by the terminal device, the control data on a service data channel of the target cell comprises:
    transmitting, by the terminal device, the control data and service data to the network device on the service data channel of the target cell when determining that the target cell is in a busy state based on the second preset rule, wherein the second preset rule is a rule used to determine whether a cell can be used to transmit service data.

10. A method for transmitting control data, the method comprising:
   determining, by a network device, at least one unlicensed cell; and
   receiving, by the network device in a target cell of the at least one unlicensed cell, control data sent by a terminal device, wherein the target cell is a cell that is in an idle state based on a first preset rule, and the first preset rule is a rule used to determine whether a cell can be used to transmit the control data.

11. The method of claim 10, wherein the first preset rule is different from a second preset rule, and the second preset rule is a rule used to determine whether a cell can be used to transmit service data.

12. The method of claim 10, wherein a transmission time period of the control data is within a transmission time range corresponding to the target cell, and the transmission time range is a time range corresponding to maximum channel occupancy time (MCOT) or a time range corresponding to one transmission opportunity (TXOP).

13. The method according to claim 10, wherein there are at least two target cells.

14. An apparatus for transmitting control data, the apparatus comprising:
   a determining unit configured to determine at least one target cell from at least one unlicensed cell, wherein the determining unit is configured to determine the at least one target cell from the at least one unlicensed cell based on a first preset rule, wherein the at least one target cell comprises a cell that is in an idle state based on the first preset rule, and wherein the first preset rule comprises a rule used to determine whether a cell can be used to transmit the control data; and
   a communications unit configured to transmit the control data in the target cell.

15. The apparatus of claim 14, wherein the determining unit is further configured to:
   determine a transmission time period of the control data; and
   determine the target cell from the at least one unlicensed cell based on the transmission time period, wherein the transmission time period is within a transmission time range corresponding to the target cell, and the transmission time range comprises a time range corresponding to maximum channel occupancy time (MCOT) or a time range corresponding to one transmission opportunity (TXOP).

16. The apparatus of claim 15, wherein the priority of the target cell is lower than a priority of a second cell of the at least one unlicensed cell and a transmission time range corresponding to the second cell does not comprise the transmission time period.

17. The apparatus according to claim 14, wherein there are at least two target cells.

* * * * *